(12) United States Patent  
Streeter et al.

(10) Patent No.: US 8,423,606 B1  
(45) Date of Patent: Apr. 16, 2013

(54) DATA FRAMING

(75) Inventors: Kevin Streeter, San Francisco, CA (US); Srinivas Manapragada, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 328 days.

(21) Appl. No.: 12/768,636

(22) Filed: Apr. 27, 2010

(51) Int. Cl.
*G06F 15/16* (2006.01)

(52) U.S. Cl.
USPC ............................ 709/203; 709/217; 709/231

(58) Field of Classification Search ......................... None
See application file for complete search history.

(56) References Cited

U.S. PATENT DOCUMENTS

| | | | |
|---|---|---|---|
| 7,110,664 B2 | 9/2006 | Yogeshwar et al. | |
| 7,461,214 B2 | 12/2008 | Arulambalam et al. | |
| 8,099,473 B2* | 1/2012 | Biderman et al. | 709/217 |
| 8,099,476 B2* | 1/2012 | Biderman et al. | 709/219 |
| 2003/0177503 A1* | 9/2003 | Sull et al. | 725/112 |
| 2004/0205648 A1* | 10/2004 | Tinsley et al. | 715/530 |
| 2004/0261091 A1* | 12/2004 | Cherkasova et al. | 725/9 |
| 2006/0248213 A1* | 11/2006 | Sherer et al. | 709/231 |
| 2007/0162568 A1 | 7/2007 | Gupta et al. | |
| 2008/0247732 A1 | 10/2008 | Mae et al. | |
| 2008/0301256 A1 | 12/2008 | McWilliams et al. | |
| 2008/0301315 A1* | 12/2008 | Cheng et al. | 709/231 |

OTHER PUBLICATIONS

"Technical Note TN2224, Best Practices for Creating and Deploying HTTP Live Streaming Media for the iPhone and iPad," Apr. 19, 2010, http://developerapple.com/iphone/library/technotes/tn2010/tn2224.html, 6 pages.

"HTTP Live Streaming Overview," Mar. 25, 2010, Apple Inc., 28 pages.

"HTTP Live Streaming draft-pantos-http-live-streaming-03," Apr. 2, 2010, R. Pantos, Ed., Apple Inc., http://www.iet.org/ietf/lid-abstracts.txt., 23 pages.

Foresman, Chris, "Apple Proposes HTTP Streaming Feature As IETF Standard," Jul. 9, 2009, retrieved from the Internet on Apr. 22, 2010, http://arstechnica.com/web/news/2009/07/apple-proposes-http-streaming-feature-as-a-protocol-standard.ars, 3 pages.

* cited by examiner

*Primary Examiner* — John B. Walsh

(74) *Attorney, Agent, or Firm* — Finch & Maloney PLLC

(57) ABSTRACT

Methods, systems, and apparatus, including computer programs encoded on a computer storage medium, are described for fragmenting a media stream (e.g., for HTTP streaming) by generating fragments that can have variable relative durations. The disclosed technologies enable fragmenting the media stream by two or more media streaming server systems to obtain respective sets of fragments having a framing structure that is consistent across the two or more media streaming server systems. Consequently, a client computer system can place HTTP requests for fragments of the media stream, e.g. for switching mid-stream, to any of the two or more media streaming server systems that generated the respective sets of fragments.

23 Claims, 13 Drawing Sheets

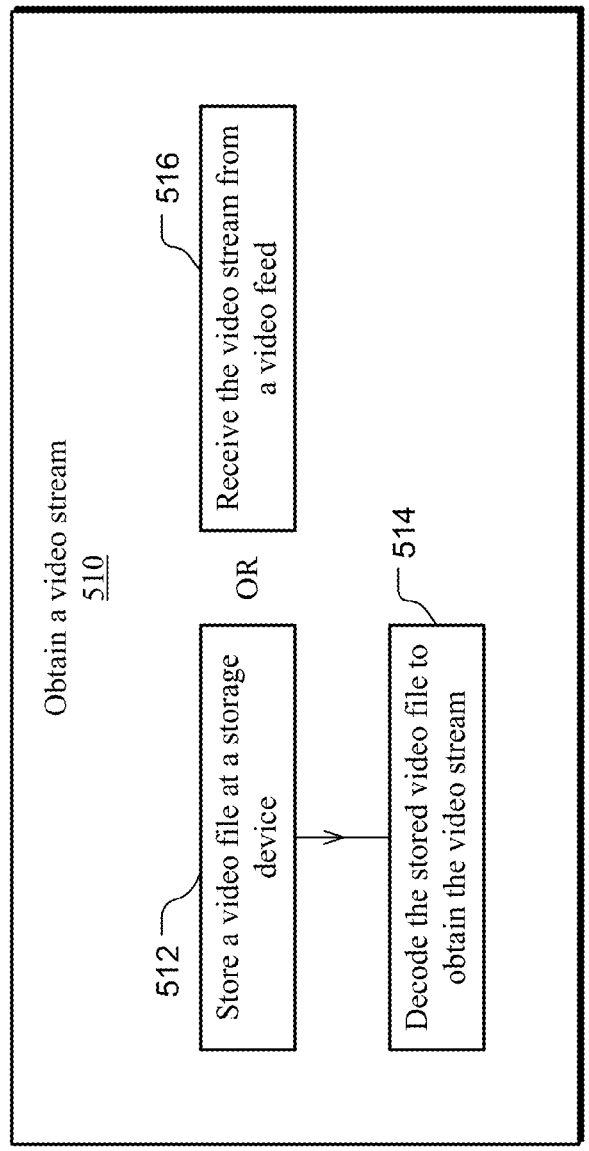

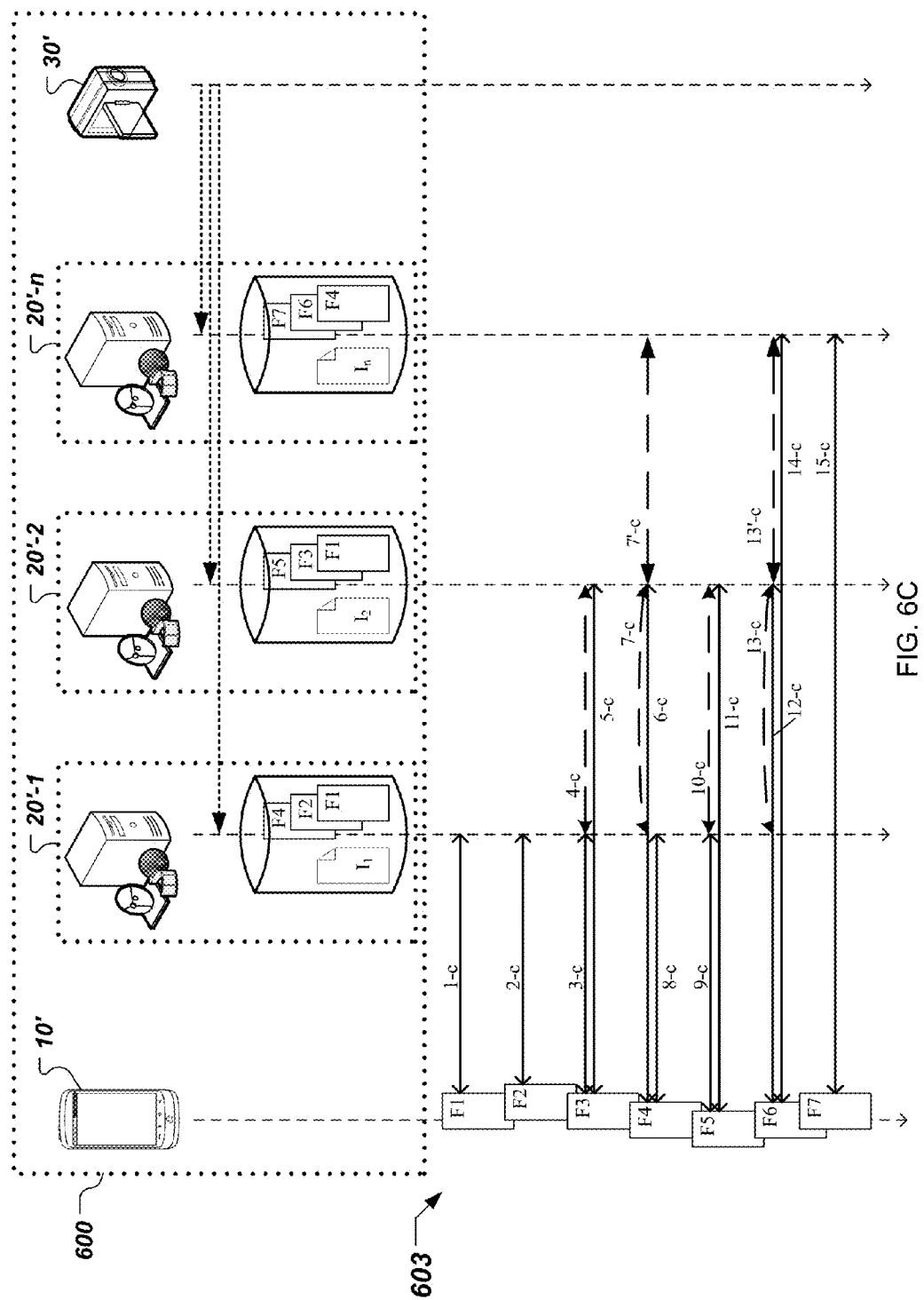

DATA FRAMING

BACKGROUND

This specification relates to framing portions of media streams for streaming via a communication channel, such as a Hypertext Transfer Protocol (HTTP) communication channel.

HTTP has become a standard protocol for Web communications. Consequently, technologies have been developed and have become available for optimizing HTTP delivery of content. For example, such optimized delivery has become widely accessible as it relies mostly on standard HTTP servers that are widely supported in content distribution networks.

The basic principles of HTTP streaming involve using software on a server to break a media stream into small fragments (also referred to as segments) saved as separate files, and to create a playlist for informing a media player client where to get the files that make up a complete media stream. The media player client downloads the files and plays the small fragments included in the downloaded files in an order specified by the playlist. If the media stream originates from a live feed, the client can periodically refresh the playlist to see if any new fragments have been added to the media stream. Breaking the media stream into fragments can be performed in accordance with "HTTP Live Streaming" standard proposals, versions 1-3 (May 5, 2009-Apr. 2, 2010) available from the Internet Engineering Task Force (IETF). These proposed standards recommend slicing the media stream into segments having a predetermined time duration, for example each segment may be ten seconds long.

SUMMARY

This specification describes technologies relating to fragmenting a media stream (e.g., for HTTP streaming) by generating fragments that can have variable relative durations. The disclosed systems and techniques enable fragmenting the media stream by two or more media streaming server systems to obtain respective sets of fragments having a framing structure that is consistent across the two or more media streaming server systems. Consequently, a client computer system can place HTTP requests for fragments of the media stream, e.g. for switching mid-stream, to any of the two or more media streaming server systems that generated the respective sets of fragments.

In general, one innovative aspect of the subject matter described in this specification can be implemented as a method performed by data processing apparatus. The method includes obtaining time references corresponding to a video stream. Further, the method includes identifying key frames in the video stream. Each of the identified key frames is a first key frame following a corresponding time reference from among the obtained time references. The method also includes generating fragments of the video stream corresponding to at least a portion of the identified key frames, respectively.

These and other implementations can include one or more of the following features. Obtaining the time references can further include receiving the time references by the data processing apparatus. Additionally, obtaining the time references can further include receiving a rule for creating the time references, and generating the time references by the data processing apparatus. The method can also include obtaining the video stream by the data processing apparatus. Obtaining the video stream can further include storing a video file at a storage device communicatively coupled with the data processing apparatus, and decoding the stored video file to obtain the video stream. Additionally, obtaining the video stream can include receiving the video stream by the data processing apparatus from a video feed source.

In some implementations, the obtained time references can be equally distributed by a predetermined time period. Further, the video stream can include key frames aperiodically distributed with respect to timing of the video stream. Furthermore, each of the generated fragments can include an associated contiguous sequence of frames starting with the identified key frame. The method can further include dropping a fragment followed by a gap between the fragment and a corresponding subsequent fragment.

In some implementations, the method includes indexing the generated fragments in an index file, and providing the index file and the generated fragments for HTTP video streaming. Indexing can include listing a fragment name, a fragment start time and a file system path for each fragment of the generated fragments. The providing may include storing the index file and the generated fragments on a storage device. Additionally, the providing may include transmitting the index file to a client computer system communicatively coupled with the data processing apparatus, and then, responsive to HTTP streaming requests from the client computer system, streaming fragments from among the generated fragments to the client computer, based on respective entries of the index file.

In some implementations, the method can be performed by the data processing apparatus at each of multiple server systems to generate respective sets of fragments and respective index files. In such implementations, the method can include transmitting the respective index files to a client computer system communicatively coupled with the plurality of server systems, and then, responsive to a request from the client computer system to a server system from among the multiple server systems for a given fragment, transmitting to the client computer the given fragment from among the set of fragments associated with the server system.

According to another aspect, the described subject matter can also be implemented in a system including multiple media streaming server systems communicatively coupled with each other, and a client computer system communicatively coupled with the multiple media streaming server systems. Each of the media streaming server systems includes one or more hardware processors configured to obtain time references corresponding to a video stream. The one or more hardware processors are further configured to identify key frames in the video stream. Each of the identified key frames is a first key frame following a corresponding time reference from among the obtained references. Furthermore, the one or more hardware processors are configured to generate an associated set of fragments of the video stream corresponding to at least a portion of the identified key frames, respectively, and to index the associated set of fragments in an associated index file. The client computer system includes a media player device configured to request a given fragment of the media stream from a media streaming server system from among the multiple media streaming server systems. The media player device is further configured to receive the given fragment and subsequently to play the given fragment.

These and other implementations can include one or more of the following features. The client computer system can be further configured to request respective index files from the multiple media streaming server systems, and to aggregate the received respective index files into a client side master index. The request for the given fragment of the media stream may be performed based on information included in the client side master index. Upon receiving from the media streaming server system a response indicating that the requested given fragment is unavailable, the client computer is further configured to request the given fragment from another media streaming server system from among the multiple media streaming server systems. Upon determining by the media streaming server system that the given fragment requested by the client computer system is locally unavailable, the media streaming server system is further configured to redirect the requested fragment to the client computer system from another media streaming server system from among the multiple media streaming server systems.

In some implementations, the system further includes a video feed source that contains one or more image acquisition devices. The video feed source is configured to stream the video stream to the multiple media streaming server systems, and to further provide to the multiple media streaming server systems the time references corresponding to the video stream. In addition, the video feed source is configured to set the time references to be equally distributed by a predetermined time period, and to encode the video stream to include key frames aperiodically distributed with respect to timing of the video stream.

According to another aspect, the described subject matter can also be implemented in a computer readable medium encoded with a computer program. The program includes instructions that when executed by data processing apparatus cause the data processing apparatus to perform operations that include obtaining time references corresponding to a video stream. The video stream can include key frames aperiodically distributed with respect to timing of the video stream. The obtained time references can be equally distributed by a predetermined time period. The operations further include identifying key frames in the video stream. Each of the identified key frames is a first key frame following a corresponding time reference from among the set of time references. Furthermore, the operations include generating fragments of the video stream corresponding to at least a portion of the identified key frames, respectively. Each of the generated fragments can include an associated contiguous sequence of frames starting with the identified key frame.

Particular embodiments of the subject matter described in this specification can be implemented so as to realize one or more of the following advantages. The systems and methods disclosed in this specification can enable any one of a plurality of media streaming server systems configured to fragment a video stream to generate the same fragment structure, regardless of where the fragmenting is started in the video stream. Consequently for HTTP streaming of a live event, any one of the plurality of media streaming server systems may start framing the live video stream sooner or later than its peers, and still come up with the same fragment structure. This allows clients to independently fetch fragments from any one of the plurality of media streaming server systems. Moreover for HTTP streaming of video on demand, one of the plurality of media streaming server systems may choose to fragment only a portion of a source asset. Regardless of the portion selected, the fragment structure matches that which would have been created on all other ones of the plurality of media streaming server systems, and again this allows clients to independently use fragments from each of media streaming server systems.

In addition, the disclosed methods and systems can enable any one of the plurality of media streaming server systems configured to fragment a video stream to generate the same fragment structure, even when there are gaps (missing video frames) in the video stream. Consequently, a given one of the plurality of media streaming server systems may stop fragmenting upon dropping the video stream, and later resume fragmenting upon re-obtaining the video stream, without a variation in fragment structure. This allows the given media streaming server system to stay in the resource pool after a failure, and allows a client to fill in the gaps from alternate ones of the plurality of media streaming server systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5A shows example implementations of a method for obtaining a media stream.

FIGS. 6A-6C show diagrams of example system and methods for HTTP video streaming based on time referenced fragments.

Like reference numbers and designations in the various drawings indicate like elements.

DETAILED DESCRIPTION

Figure 1:
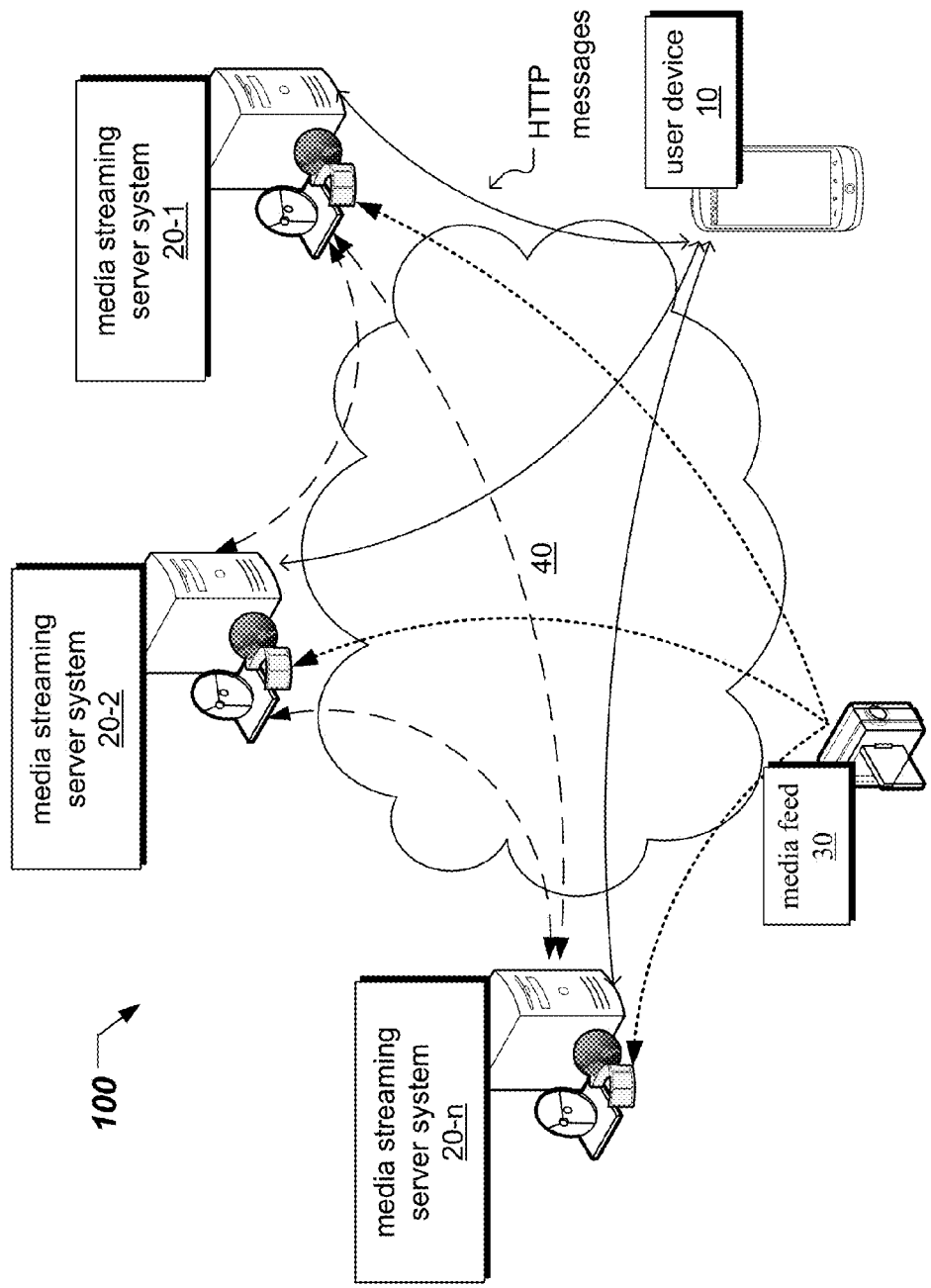
FIG. 1 shows an example of a system for media streaming.

As shown in FIG. 1, a system 100 for media streaming can include a user device 10 that is communicatively coupled with a plurality of media streaming server systems 20-$j$, where j=1, 2, ... , n. The communication channels (illustrated as full-lines) used for media streaming can be implemented via a communication network 40 (e.g., the Internet). User device 10 can be a laptop computer, a smartphone, and the like, and includes a media player for rendering media streams received by user device 10 from the media streaming server systems 20-$j$.

In some implementations, communication channels (illustrated as dashed-lines) between the plurality of media streaming server systems 20-$j$ can be implemented via a public network (e.g., the Internet 40), via a private (e.g., corporate, affiliate, and the like) network, or a combination of these (e.g., a virtual private network). A media feed source 30 can be communicatively coupled with the plurality of media streaming server systems 20-$j$ via public or private communication channels. (The communication channels between media feed source 30 and the plurality of media streaming server systems 20-$j$ are illustrated as dotted-lines.) Media feed source 30 can stream to the plurality of media streaming server systems 20-$j$ a live or prerecorded media stream in a multicast fashion. Additionally, media feed source 30 can stream to the plurality of media streaming server systems 20-*j* prerecorded media streams in a single-cast fashion.

In some implementations, the plurality of media streaming server systems 20-*j* can stream media streams to the user device 10 using HTTP via transmission control protocol (TCP). HTTP streaming includes three aspects: a server aspect, a distribution aspect, and a client aspect. The server aspect is executed at any one of the plurality of media streaming server systems 20-*j* and includes techniques for taking input media messages and encoding them digitally, encapsulating the encoded media in a format suitable for HTTP delivery, and preparing the encapsulated media for HTTP distribution. The distribution aspect includes running standard HTTP web servers on the plurality of media streaming server systems 20-*j*. Such HTTP web servers are configured to accept client requests, e.g., from user device 10, and further configured to deliver prepared media and associated resources to the client. The client aspect includes running a media player on the user device 10. The media player is configured to determine the appropriate media to request, to download the media resources, and then to reassemble them so that the downloaded media can be presented to an audience member associated with user device 10 in a continuous media stream.

Figure 2:
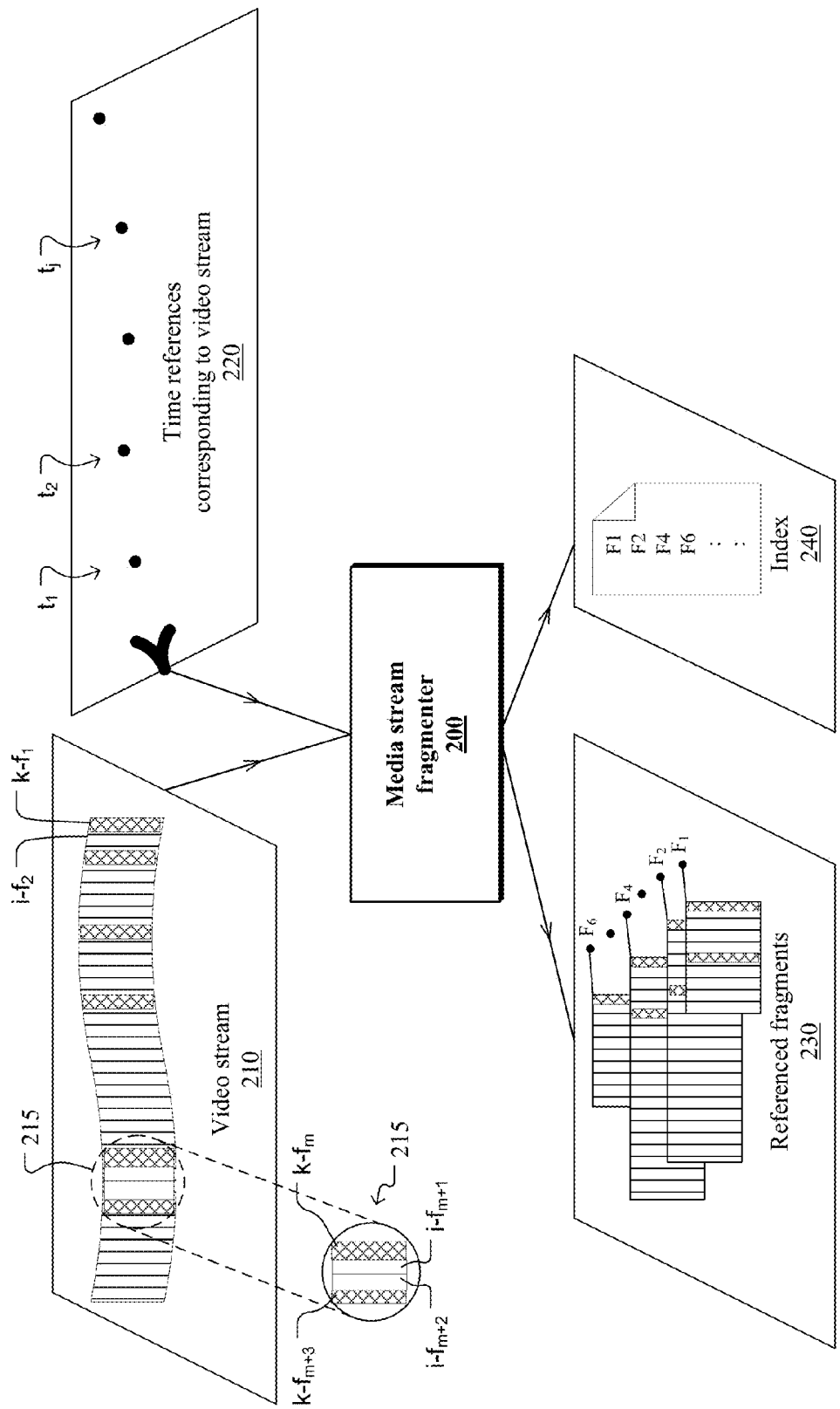
FIG. 2 shows an example of a system component for fragmenting a media stream into time referenced fragments.
Figure 3:
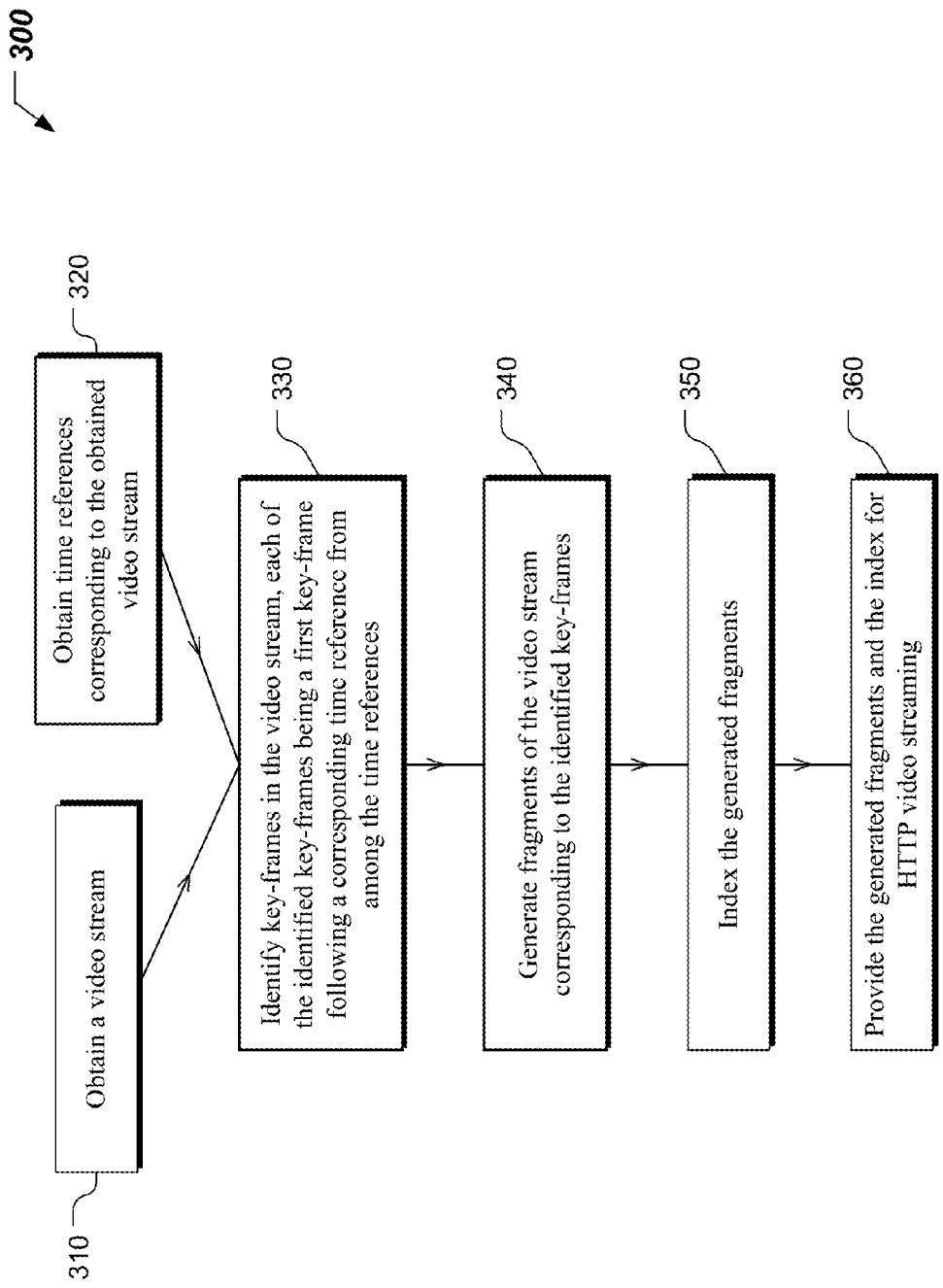
FIG. 3 shows an example of a method for generating time referenced fragments of a media stream.

The server aspect of the HTTP streaming process includes operating a server component configured to obtain a media stream and to divide it into a set of small media files. FIG. 2 shows a diagram of an example server component 200, referred to as a media stream fragmenter 200, for framing the media stream into time referenced fragments in accordance with an example method 300 illustrated by a flow chart in FIG. 3. The media stream can include a sequence of content messages or samples, each with a timestamp denoting when the content should be decoded. The message timestamps are increasing, i.e. moving forward in time. In addition, a media stream may be obtained from a media file stored on disk, from a streaming network media source that uses real-time messaging protocol (RTMP) or real-time transport protocol (RTP), or may be captured directly from an analog source via an analog-to-digital converter. Moreover, the media stream can include any type of media content, e.g., video, audio, timed data, and the like. For example, the media stream illustrated in FIG. 2 represents a video stream 210.

Video streams typically follow the historic animation paradigm of sequentially playing a series of frames that change the scene slightly in each successive frame. When the frames are played or displayed at a certain rate per time unit, the timed changes simulate the appearance of motion. In electronic media, the concept of key-frames was adopted to make the size of media files more manageable. A key-frame is a single frame of a given display that contains all of the visual information and instructions that allows a viewer or player device to render the entire display. A key-frame may be large relative to the size of a typical single frame. However, it contains all of the visual information used to render the entire display; therefore, its size is expected to be larger. The key-frames of video stream portion 215 are represented by cross-hatched rectangles and are labeled "k-$f_m$". Letter "f" stands for "frame", letter "k" stands for "key" and the index "m" denotes the "$m^{th}$ frame" of video stream 210. For example, video stream 210 starts with frame 1, which is a key-frame, k-$f_1$.

In video, often times changes in the visual objects are generally very slight per unit time. Therefore, a change in a scene from one second or millisecond to the next may also be very slight. Because of this slight change, it was found to be more efficient to send an intermediate-frame that consists of only the change in the scene. By including only the change, and not any of the redundant information, the size of these intermediate or i-frames, becomes very small relative to the key-frames. This process allows video streams to display complex visuals, yet still remain relatively small in size. The intermediate-frames of video stream portion 215 are represented by unfilled rectangles and are labeled "i-$f_n$". Once again, letter "f" stands for "frame", letter "i" stands for "intermediate" and the index "n" denotes the "$n^{th}$ frame" of video stream 210. For example, the frame of video stream 210 following k-$f_1$ is frame 2, which is an intermediate-frame, i-$f_2$.

Therefore, in video streams, the key-frames are typically separated by various lengths of time with a series of i-frames that define all of the changes to the scene from one key-frame to the next. Close-up 215 shows a key-frame, k-$f_m$, followed by intermediate-frames i-$f_{m+1}$ and i-$f_{m+2}$. A decodable sequence of frames including an anchor key-frame and corresponding intermediate-frames can be referred to as a group of pictures (GOP). The next key-frame, k-$f_{m+3}$, represents the scene as it evolves from the previous key-frame k-$f_m$ to include all of the changes from the interim i-frames. Subsequent i-frames begin representing the changes to the scene after the next key-frame, k-$f_{m+3}$. This process continues until the video stream has ended.

The media stream fragmenter 200 is configured to fragment the obtained video stream 210. Fragmenting enables grouping of video stream frames (which tend to be very small and thus expensive to manage and transmit individually) as a video fragment (or video block) that can be managed, transmitted, and played back as a group. Moreover, media stream fragmenter 200 is further configured to break up video stream 210 such that each generated fragment can be decoded and played back independently, i.e., each fragment begins with a key-frame. Generating fragments that can be decoded independently enables HTTP streaming for which multiple fragments need not to be transmitted for playback to begin. Further, media fragmenter 200 is configured to fragment the obtained video stream 210 to obtain fragments that are independently decodable whether intervals between key-frames of video stream 210 are constant or variable. For example, the obtained video stream 210 may contain key-frames aperiodically distributed with respect to timing of video stream 210. Generating fragments that have variable duration enables fragmenting of video streams for which the key-frames need not lay at constant time intervals. Furthermore, media fragmenter 200 is configured to fragment the obtained video stream 210 into fragments that can contain one or more key-frames in addition to the key-frame corresponding to the beginning of a fragment. Thus, multiple instances of media stream fragmenter 200 can run on respective multiple media streaming server systems 20-*j* to come up with identical versions of HTTP framing, independently of where in the video stream 210 (at which frame, at what time, etc.) the multiple instances of media stream fragmenter 200 start the fragmenting.

Method 300 can begin by obtaining 310 video stream 210 by media stream fragmenter 200. Examples of ways to obtain 310 video stream 210 are described below in connection to FIG. 5A.

Method 300 includes obtaining 320 by media stream fragmenter 200 of time references 220 corresponding to the obtained video stream 210. The time references 220 represent a unique sequence of times t1, t2, . . . tj, . . . made available across a plurality of media streaming server systems 20-*j* running respective instances of media stream fragmenter 200. The shared time references 220 can be included in the video stream 210 (e.g., the obtaining 310 and the obtaining 320 can be the same operation), or the time references 220 can be provided separately (e.g., calculated based on other information provided in the video stream 210 or from another source). The shared time references 220 are used to guide fragment sequence framing decisions in a way that is reproducible across the plurality of media streaming server systems 20-$j$. Time references 220 may be separated by a predetermined time interval that can represent an expected duration for a fragment. The predetermined time interval may be close to or identical with a key-frame interval of video stream 210. However, media stream fragmenter 200 implementing method 300 can handle permanent or transient deviations from a constant value of the key-frame interval. Examples of ways to obtain 320 time references 220 are described below in connection to FIG. 5B.

Method 300 can further include identifying 330 by media stream fragmenter 200 of key-frames in media stream 210, such that each of the identified key-frames is a first key-frame following a corresponding time reference from among the obtained time references 220. Also, method 300 can include generating 340 fragments 230 of video stream 210 corresponding to the identified key-frames. A generated fragment is labeled "F" and represents an independently decodable block of video frames (beginning with a corresponding identified key-frame) that has been framed for independent transmission. Each fragment can have a corresponding fragment number "n" that is based on the timestamp of the first message in the fragment, such that an associated fragment number uniquely identifies a fragment. For example, the $n^{th}$ generated fragment is labeled $F_n$. However, some fragment numbers need not refer to a generated fragment. For example, when variations in the video stream's key-frame structure prevents media stream fragmenter 200 from generating a particular fragment, $F_s$, media stream fragmenter 200 can track the particular fragment $F_s$ as a skipped fragment. For example, the generated fragments 230 illustrated in FIG. 2 include fragments F1, F2, F4 and F6, while F3 and F5 have not been generated; thus, F3 and F5 can be tracked as skipped fragments. Additionally, a fragment $F_g$ that has been generated (by at least one instance of media stream fragmenter 200) but is missing at a given one of the plurality of media streaming server systems 20-$j$ is referred to as a fragment gap. A client can be notified of a fragment gap at the given media streaming server system and may fetch the missing fragment from another one of the plurality of media streaming server systems 20-$j$. Multiple examples of ways to identify 330 the key-frames that immediately follow corresponding time references and to generate 340 fragments 230 corresponding to the identified key-frames are described below in connection to FIGS. 4A-4D.

Furthermore, method 300 can include indexing 350 by media stream fragmenter 200 of the generated fragments 230. An index file 240 can list a fragment name, a fragment start time, a file system path for each one of the generated fragments 230, or other information used to identify the generated fragments 230 on any one of the plurality of media streaming server systems 20-$j$. In some implementations, media stream fragmenter 200 can update index file 240 upon completion of fragment creation.

Fragments 230 and index 240 generated by media stream fragmenter 200 run by a given one of the plurality of media streaming server systems 20-$j$ can be provided 360 for HTTP streaming from the given media streaming server system to user device 10. Examples of ways to provide 360 the generated fragments 230 and index 240 are described below in connection with FIGS. 5C and 6A-6C.

As described above, method 300 implemented on media stream fragmenter 200 can enable any one of the plurality of media streaming server systems 20-$j$ performing the fragmenting of video stream 210 to generate the same fragment structure, regardless of where the fragmenting is started in video stream 210. Consequently for HTTP streaming of a live event, any one of the plurality of media streaming server systems 20-$j$ may start framing a live video stream sooner or later than its peers, and still come up with the same fragment structure. This allows clients to independently fetch fragments from any of the plurality of media streaming server systems 20-$j$. Moreover for HTTP streaming of video on demand, one of the plurality of media streaming server systems 20-$j$ may choose to fragment only a portion of a source asset. Regardless of the portion selected, the fragment structure matches that which would have been created on all other ones of the plurality of media streaming server systems 20-$j$, and again this allows clients to independently use fragments from each of media streaming server systems 20-$j$.

In addition, method 300 implemented on media stream fragmenter 200 can enable any one of the plurality of media streaming server systems 20-$j$ performing the framing of video stream 210 to generate the same fragment structure, even when there are holes or "gaps" in video stream 210. Consequently, a given one of the plurality of media streaming server systems 20-$j$ may stop fragmenting upon dropping the video stream 210, and later resume fragmenting upon re-obtaining the video stream 210, without a variation in fragment structure. This allows the given media streaming server system to stay in the resource pool after a failure, and allows a client to fill in the gaps from alternate ones of the plurality of media streaming server systems 20-$j$.

Figure 4A:
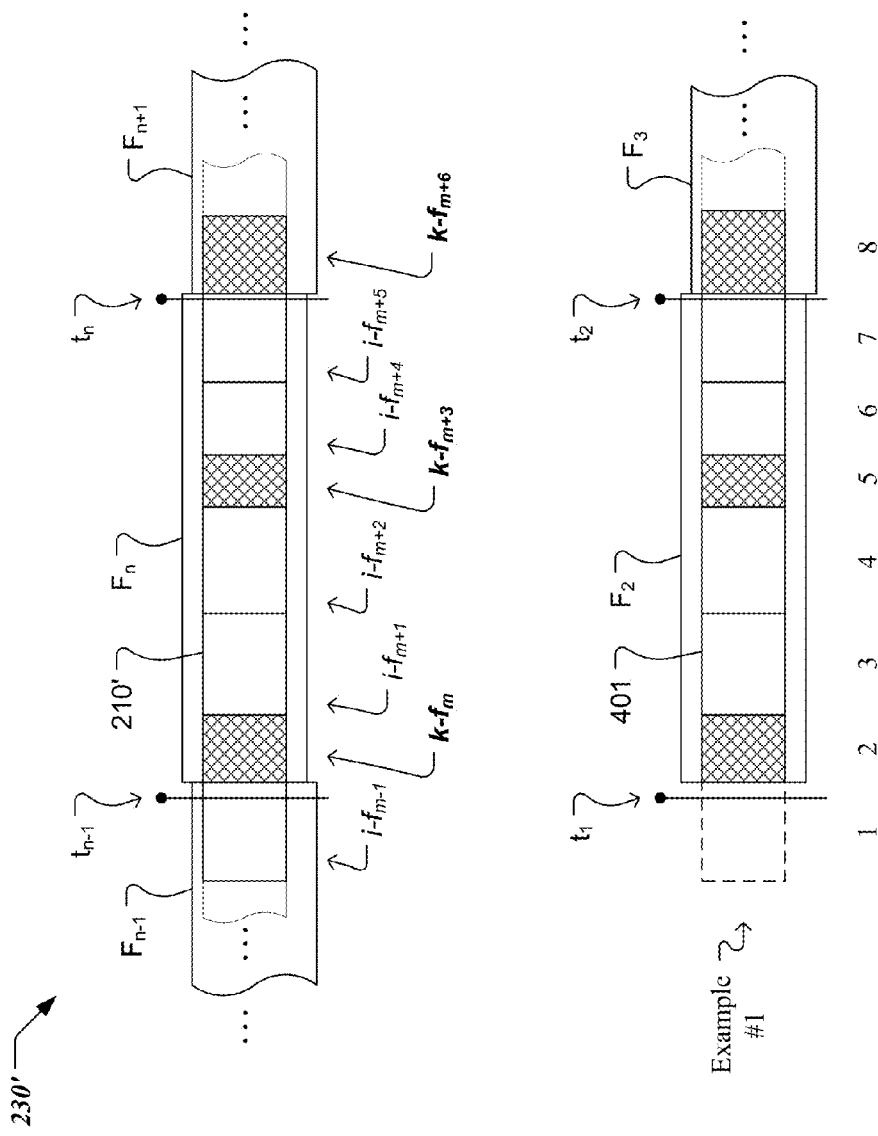
FIGS. 4A-4C are block diagrams that show aspects of the system and method for generating time referenced fragments of media streams.
Figure 4B:
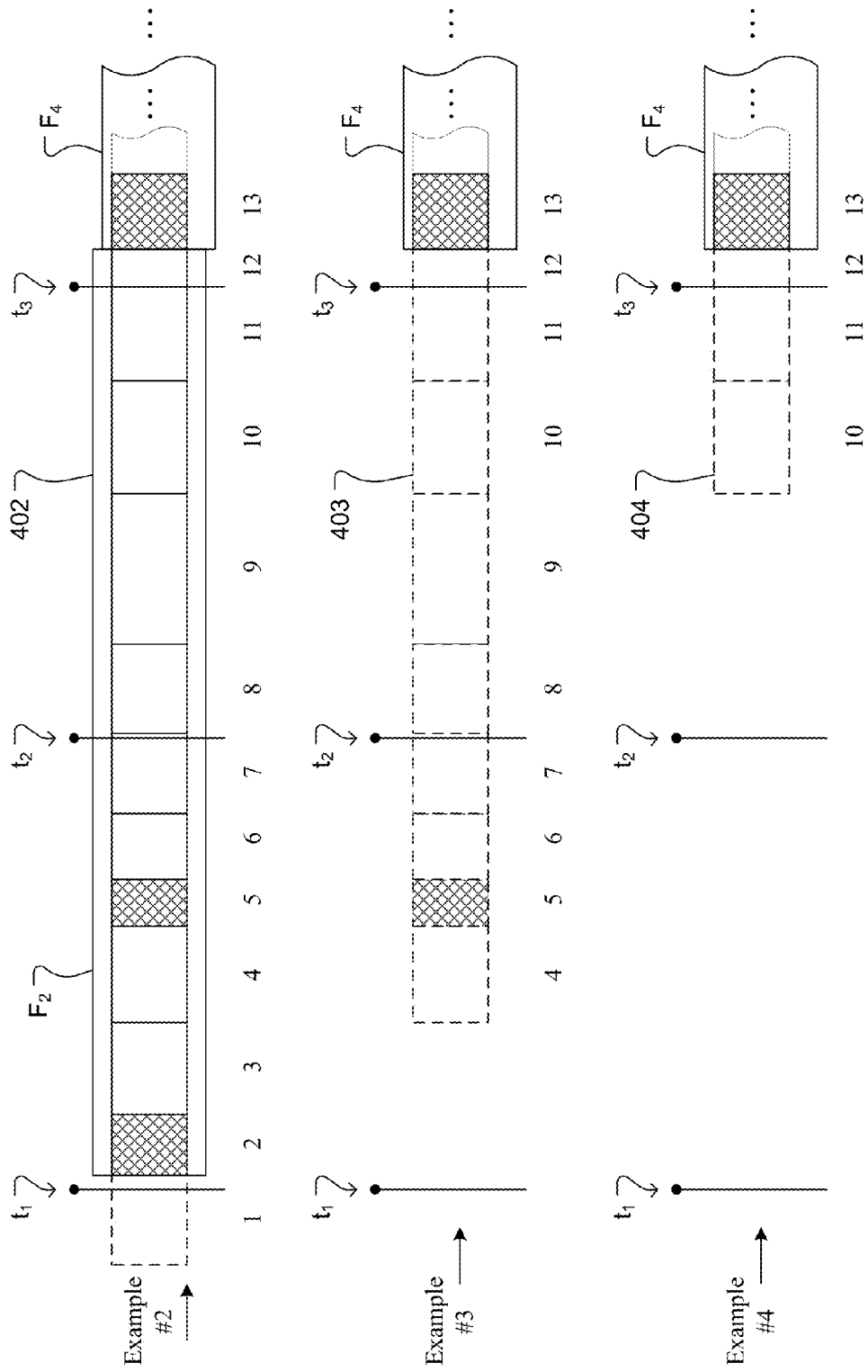
Figure 4C:
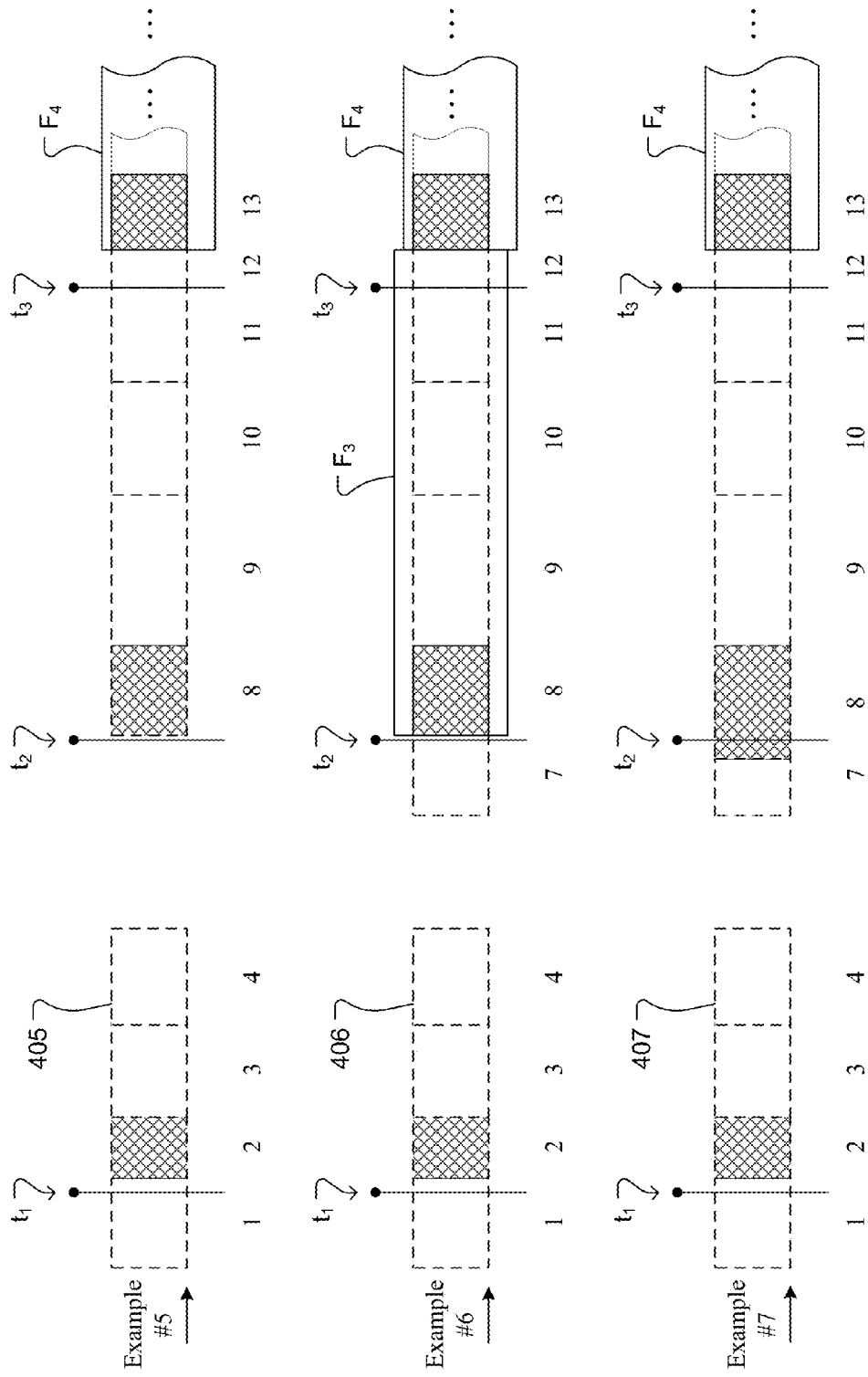

FIGS. 4A-4C are block diagrams that show aspects of method 300 implemented at media stream fragmenter 200 for generating time referenced fragments of media streams. FIG. 4A shows a representation of video stream 210' obtained by media stream fragmenter 200 at an initial time (in the past, represented by ellipses to the left of the drawing.) Video stream 210' includes frames m−1, m, . . . , and m+6, and continues beyond these frames to a final time (in the future, represented by ellipses to the right of the drawing.) In accordance with the convention described above, the key-frames are represented by cross-hatched rectangles and the intermediate-frames are represented by unfilled rectangles. Media stream fragmenter 200 also obtained, along with video stream 210', the time references $t_n$ (n=2, 3, . . . ) associated with the obtained video stream 210'. A set of fragments 230' including $F_{n-1}$, $F_n$ and $F_{n+1}$ can be generated in a fashion described below. In this example situation, fragments 230' $F_1$, . . . , $F_{n-2}$ have been either generated, skipped or dropped. Also media stream fragmenter 200 has reached operational steady-state. Within the snapshot of operational steady state illustrated in FIG. 4A, media stream fragmenter 200 has started generating fragment $F_{n-1}$, and has obtained intermediate-frame i-$f_{m-1}$ of video stream 210'.

At this stage, media stream fragmenter 200 monitors for a time reference. Upon detecting time reference $t_{n-1}$, media stream fragmenter 200 switches to monitoring for a key-frame immediately following the detected time reference $t_{n-1}$. Upon detecting key-frame k-$f_m$, media stream fragmenter 200 completes the generation of fragment $F_{n-1}$ by including intermediate-frame i-$f_{m-1}$ as the last frame of fragment $F_{n-1}$, and starts generating another fragment, $F_n$, beginning with key-frame k-$f_m$.

Once again, media stream fragmenter 200 monitors for a next time reference. Note that while doing so, intermediate-frames i-$f_{m+1}$ and i-$f_{m+2}$, key-frame k-$f_{m+3}$, and intermediate-frames i-$f_{m+4}$ and i-$f_{m+5}$ are being accumulated into fragment $F_n$. Further note that detection of key-frame k-$f_{m+3}$ has triggered neither completing of fragment $F_n$ nor starting of a new fragment. Consequently, fragment $F_n$ includes other key-frames in addition to the key-frame at the beginning of fragment $F_n$, as described above in connection with FIG. 2. Upon detecting the next time reference $t_n$, once again media stream fragmenter 200 switches to monitoring for a key-frame immediately following the detected time reference $t_n$. Upon detecting key-frame k-$f_{m+6}$, media stream fragmenter 200 completes the generation of fragment $F_n$ by including intermediate-frame i-$f_{m+5}$ as the last frame of fragment $F_n$, and starts generating the next fragment, $F_{n+1}$, beginning with key-frame k-$f_{m+6}$. Further, media stream fragmenter 200 can continue to generate time referenced fragments until reaching the end of video stream 210'.

Examples 1-7 represent non-steady state operation of media stream fragmenter 200. Throughout examples 1-7, key-frames of video streams are depicted by cross-hatched rectangles and intermediate-frames of the video streams are depicted by unfilled rectangles.

In Example 1, illustrated in FIG. 4A, an instance of media stream fragmenter 200 running on a given one the plurality of media streaming server systems 20-$j$ obtains video stream 401 starting at intermediate-frame 1, and also obtains time references $t_1$, $t_2$, ... corresponding to video stream 401. At this stage, media stream fragmenter 200 proceeds to monitor for a time reference. Upon detecting time reference $t_1$, media stream fragmenter 200 switches to monitoring for either a key-frame immediately following the detected time reference $t_1$, or for a next time reference $t_2$. Upon detecting key-frame 2, media stream fragmenter 200 drops previously obtained frame 1, and starts generating fragment $F_2$ beginning with key-frame 2. (Dropped frames are depicted by rectangles having a dashed-line perimeter.) Once again, media stream fragmenter 200 switches back to monitoring for a time reference. Note that while doing so, intermediate-frames 3 and 4, key-frame 5, and intermediate-frames 6 and 7 are being accumulated into fragment $F_2$. Further note that detection of key-frame 5 has triggered neither completing of fragment $F_2$ nor starting of a new fragment. Consequently, fragment $F_2$ includes another key-frame in addition to key-frame 2 that anchors fragment $F_2$. Upon detecting the next time reference $t_2$, once again media stream fragmenter 200 switches to monitoring for either a key-frame immediately following the detected time reference $t_2$, or for a next time reference $t_3$. Upon detecting key-frame 8, media stream fragmenter 200 completes the generation of fragment $F_2$ at the end of intermediate-frame 7, and starts generating a next fragment $F_3$ beginning with key-frame 8. Further, media stream fragmenter 200 can continue to generate time referenced fragments until reaching the end of video stream 401.

In summary, media stream fragmenter 200 processes video stream 401 of Example 1 to generate at least fragments $F_2$ and $F_3$, and a fragment gap including at least fragment $F_1$. Fragment $F_1$, which is part of the fragment gap at the given media streaming server system, may be obtained by a client 10 from other of the plurality of media streaming server systems 20-$j$ which may have generated fragment $F_1$.

In Example 2, illustrated in FIG. 4B, an instance of media stream fragmenter 200 running on a given one the plurality of media streaming server systems 20-$j$ obtains video stream 402 starting at intermediate-frame 1, and also obtains time references $t_1$, $t_2$, $t_3$, ... corresponding to video stream 402. At this stage, media stream fragmenter 200 proceeds to monitor for a time reference. Upon detecting time reference $t_1$, media stream fragmenter 200 switches to monitoring for either a key-frame immediately following the detected time reference $t_1$, or for the next time reference $t_2$. Upon detecting key-frame 2, media stream fragmenter 200 drops previously obtained frame 1, and starts generating fragment $F_2$ beginning with key-frame 2. (Dropped frames are depicted by rectangles having a dashed-line perimeter.) Once again, media stream fragmenter 200 switches back to monitoring for a time reference. Note that while doing so, intermediate-frames 3 and 4, key-frame 5, and intermediate-frames 6 and 7 are being accumulated into fragment $F_2$. Further note that detection of key-frame 5 has triggered neither completing of fragment $F_2$ nor starting of a new fragment. Consequently, fragment $F_2$ includes another key-frame in addition to key-frame 2 that anchors fragment $F_2$.

Upon detecting the next time reference $t_2$, once again media stream fragmenter 200 switches to monitoring for either a key-frame immediately following the detected time reference $t_2$, or for the next time reference $t_3$. However, in Example 2, the next time reference $t_3$ is being detected by media stream fragmenter 200 prior to detecting a key-frame. Consequently, fragment $F_3$ corresponding to a time interval between consecutive time references $t_2$ and $t_3$ is being tracked as a skipped fragment, while intermediate-frames 8, 9, 10 and 11 are also being added to fragment $F_2$. In addition, media stream fragmenter 200 once again switches to monitoring for either a key-frame immediately following the detected time reference $t_3$, or for the next time reference $t_4$. Note that while doing so, intermediate-frame 12 is being added to fragment $F_2$. Upon detecting key-frame 13, media stream fragmenter 200 completes the generation of fragment $F_2$ at the end of intermediate-frame 12, and starts generating a next fragment $F_4$ beginning with key-frame 13. Further, media stream fragmenter 200 can continue to generate time referenced fragments until reaching the end of video stream 402.

In summary, media stream fragmenter 200 processes video stream 402 of Example 2 to generate at least fragments $F_2$ and $F_4$, a fragment gap including at least fragment $F_1$, and a record of skipped fragments including at least $F_3$. Fragment $F_1$, which is part of the fragment gap at the given media streaming server system, may be obtained by a client 10 from other of the plurality of media streaming server systems 20-$j$ which may have generated fragment $F_1$. However, fragment $F_3$, which is part of the record of skipped fragments at the given media streaming server system, has not been generated at any other of the plurality of media streaming server systems 20-$j$.

In Example 3, illustrated in FIG. 4B, an instance of media stream fragmenter 200 running on a given one the plurality of media streaming server systems 20-$j$ obtains video stream 403 starting at intermediate-frame 4, and also obtains time references $t_1$, $t_2$, $t_3$, ... corresponding to video stream 403. At this stage, media stream fragmenter 200 proceeds to monitor for a time reference. Upon detecting time reference $t_2$, media stream fragmenter 200 switches to monitoring for either a key-frame immediately following the detected time reference $t_2$, or for the next time reference $t_3$. However, the next time reference $t_3$ is being detected by media stream fragmenter 200 prior to detecting a key-frame. Consequently, media stream fragmenter 200 continues monitoring for either a key-frame immediately following the detected time reference $t_3$, or for the next time reference $t_4$. Upon detecting key-frame 13, media stream fragmenter 200 drops previously obtained frames 4-12, and starts generating fragment $F_4$ beginning with key-frame 13. (Dropped frames are depicted by rectangles having a dashed-line perimeter.) Further, media stream fragmenter 200 can continue to generate time referenced fragments until reaching the end of video stream 403. Note that because key-frame 5 was detected prior to detecting a time reference, generating of a fragment starting with key-frame 5 has been disallowed.

In summary, media stream fragmenter 200 processes video stream 403 of Example 3 to generate at least fragment $F_4$, and a fragment gap including at least fragments $F_1$, $F_2$ and $F_3$. Fragments $F_1$, $F_2$ and $F_3$, that are part of the fragment gap at the given media streaming server system, may be obtained by a client 10 from other of the plurality of media streaming server systems 20-j which may have generated fragments $F_1$, $F_2$ and $F_3$.

In Example 4, illustrated in FIG. 4B, an instance of media stream fragmenter 200 running on a given one the plurality of media streaming server systems 20-j obtains video stream 404 starting at intermediate-frame 10, and also obtains time references $t_1, t_2, t_3, \ldots$ corresponding to video stream 404. At this stage, media stream fragmenter 200 proceeds to monitor for a time reference. Upon detecting time reference $t_3$, media stream fragmenter 200 switches to monitoring for either a key-frame immediately following the detected time reference $t_3$, or for the next time reference $t_4$. Upon detecting key-frame 13, media stream fragmenter 200 drops previously obtained frames 10-12, and starts generating fragment $F_4$ beginning with key-frame 13. (Dropped frames are depicted by rectangles having a dashed-line perimeter.) Further, media stream fragmenter 200 can continue to generate time referenced fragments until reaching the end of video stream 404.

In summary, media stream fragmenter 200 processes video stream 404 of Example 4 to generate at least fragment $F_4$, and a fragment gap including at least fragments $F_1$, $F_2$ and $F_3$. Fragments $F_1$, $F_2$ and $F_3$, that are part of the fragment gap at the given media streaming server system, may be obtained by a client 10 from other of the plurality of media streaming server systems 20-j which may have generated fragments $F_1$, $F_2$ and $F_3$.

In Example 5, illustrated in FIG. 4C, an instance of media stream fragmenter 200 running on a given one the plurality of media streaming server systems 20-j obtains video stream 405 starting at intermediate-frame 1, and also obtains time references $t_1, t_2, t_3, \ldots$ corresponding to video stream 405. At this stage, media stream fragmenter 200 proceeds to monitor for a time reference. Upon detecting time reference $t_1$, media stream fragmenter 200 switches to monitoring for either a key-frame immediately following the detected time reference $t_1$, or for the next time reference $t_2$. Upon detecting key-frame 2, media stream fragmenter 200 drops the previously obtained frame 1, and starts generating fragment $F_2$ beginning with key-frame 2. (Dropped frames are depicted by rectangles having a dashed-line perimeter.) Once again, media stream fragmenter 200 switches back to monitoring for a time reference. Note that while doing so, media stream fragmenter 200 obtains intermediate-frames 3 and 4 and adds them to fragment $F_2$, but fails to obtain frames 5, 6 and 7. Some frames of video stream 405 may not be obtained because the associated one of the plurality of media streaming server systems 20-j that runs media stream fragmenter 200 can go offline temporarily. Upon encountering a gap in video stream 405, media stream fragmenter 200 drops the previously obtained frames 2-4, and cancels the generation in progress of fragment $F_2$. By doing so, media stream fragmenter 200 avoids generating partially filled fragments, i.e., fragments including non-contiguous sequences of video stream frames. Moreover in Example 5, media stream fragmenter 200 detects the next time reference $t_2$ prior to re-obtaining video stream 405. Eventually, media stream fragmenter 200 re-obtains video stream 405 starting with key-frame 8. However at this stage, media stream fragmenter 200 is configured to monitor for a time reference. Upon detecting time reference $t_3$, media stream fragmenter 200 switches to monitoring for either a key-frame immediately following the detected time reference $t_3$, or for the next time reference $t_4$. Upon detecting key-frame 13, media stream fragmenter 200 drops previously obtained frames 8-12, and starts generating fragment $F_4$ beginning with key-frame 13. Further, media stream fragmenter 200 can continue to generate time referenced fragments until reaching the end of video stream 405.

In summary, media stream fragmenter 200 processes video stream 405 of Example 5 to generate at least fragment $F_4$, and a fragment gap including at least fragments $F_1$, $F_2$ and $F_3$. Fragments $F_1$, $F_2$ and $F_3$, that are part of the fragment gap at the given media streaming server system, may be obtained by a client 10 from other of the plurality of media streaming server systems 20-j which may have generated fragments $F_1$, $F_2$ and $F_3$.

In Example 6, illustrated in FIG. 4C, an instance of media stream fragmenter 200 running on a given one the plurality of media streaming server systems 20-j obtains video stream 406 starting at intermediate-frame 1, and also obtains time references $t_1, t_2, t_3, \ldots$ corresponding to video stream 406. At this stage, media stream fragmenter 200 proceeds to monitor for a time reference. Upon detecting time reference $t_1$, media stream fragmenter 200 switches to monitoring for either a key-frame immediately following the detected time reference $t_1$, or for the next time reference $t_2$. Upon detecting key-frame 2, media stream fragmenter 200 drops the previously obtained frame 1, and starts generating fragment $F_2$ beginning with key-frame 2. (Dropped frames are depicted by rectangles having a dashed-line perimeter.) Once again, media stream fragmenter 200 switches back to monitoring for a time reference. Note that while doing so, media stream fragmenter 200 obtains intermediate-frames 3 and 4 and adds them to fragment $F_2$, but fails to obtain frames 5 and 6. Some frames of video stream 406 may not be obtained because the associated one of the plurality of media streaming server systems 20-j that runs media stream fragmenter 200 can go offline temporarily.

Upon encountering a gap in video stream 406, media stream fragmenter 200 drops the previously obtained frames 2-4, and cancels the generation in progress of fragment $F_2$. By doing so, media stream fragmenter 200 avoids generating partially filled fragments, i.e., fragments including non-contiguous sequences of video stream frames. Eventually, media stream fragmenter 200 re-obtains video stream 406 starting with intermediate-frame 7. At this stage, media stream fragmenter 200 is configured to monitor for a time reference. Upon detecting time reference $t_2$, media stream fragmenter 200 switches to monitoring for either a key-frame immediately following the detected time reference $t_2$, or for the next time reference $t_3$. Upon detecting key-frame 8, media stream fragmenter 200 drops previously obtained frame 7, and starts generating a fragment $F_3$ beginning with key-frame 8. Once again, media stream fragmenter 200 switches back to monitoring for a time reference. Note that while doing so, intermediate-frames 9, 10 and 11 are being added to fragment $F_3$. Upon detecting time reference $t_3$, media stream fragmenter 200 switches to monitoring for either a key-frame immediately following the detected time reference $t_3$, or for the next time reference $t_4$. Note that while doing so, intermediate-frame 12 is being added to fragment $F_3$. Upon detecting key-frame 13, media stream fragmenter 200 completes the generation of fragment $F_3$ at the end of intermediate-frame 12, and starts generating a next fragment $F_4$ beginning with key-frame 13. Further, media stream fragmenter 200 can continue to generate time referenced fragments until reaching the end of the video stream 406.

In summary, media stream fragmenter 200 processes video stream 406 of Example 6 to generate at least fragments $F_3$ and $F_4$, and a fragment gap including at least fragments $F_1$ and $F_2$. Fragments $F_1$ and $F_2$, which are part of the fragment gap at the given media streaming server system, may be obtained by a client 10 from other of the plurality of media streaming server systems 20-j which may have generated fragments $F_1$ and $F_2$.

In Example 7, illustrated in FIG. 4C, an instance of media stream fragmenter 200 running on a given one the plurality of media streaming server systems 20-j obtains video stream 407 starting at intermediate-frame 1, and also obtains time references $t_1, t_2, t_3, \ldots$ corresponding to video stream 407. At this stage, media stream fragmenter 200 proceeds to monitor for a time reference. Upon detecting time reference $t_1$, media stream fragmenter 200 switches to monitoring for either a key-frame immediately following the detected time reference $t_1$, or for the next time reference $t_2$. Upon detecting key-frame 2, media stream fragmenter 200 drops the previously obtained frame 1, and starts generating fragment $F_2$ beginning with key-frame 2. (Dropped frames are depicted by rectangles having a dashed-line perimeter.) Once again, media stream fragmenter 200 switches back to monitoring for a time reference. Note that while doing so, media stream fragmenter 200 obtains intermediate-frames 3 and 4 and adds them to fragment $F_2$, but fails to obtain frames 5 and 6. Some frames of video stream 407 may not be obtained because the associated one of the plurality of media streaming server systems 20-j that runs media stream fragmenter 200 can go offline temporarily.

Upon encountering a gap in video stream 407, media stream fragmenter 200 drops the previously obtained frames 2-4, and cancels the generation in progress of fragment $F_2$. By doing so, media stream fragmenter 200 avoids generating partially filled fragments, i.e., fragments including non-contiguous frame sequences. Eventually, media stream fragmenter 200 re-obtains video stream 407 starting with intermediate-frame 7. At this stage, media stream fragmenter 200 is configured to monitor for a time reference. Upon detecting the next time reference $t_2$, once again media stream fragmenter 200 switches to monitoring for either a key-frame immediately following the detected time reference $t_2$, or for the next time reference $t_3$. However, in Example 7, the next time reference $t_3$ is being detected by media stream fragmenter 200 prior to detecting a key-frame. Consequently, media stream fragmenter 200 continues monitoring for either a key-frame immediately following the detected time reference $t_3$, or for the next time reference $t_4$. Upon detecting key-frame 13, media stream fragmenter 200 drops previously obtained frames 7-12, and starts generating fragment $F_4$ beginning with key-frame 13. Further, media stream fragmenter 200 can continue to generate time referenced fragments until reaching the end of video stream 407.

In summary, media stream fragmenter 200 processes video stream 407 of Example 7 to generate at least fragment $F_4$, and a fragment gap including at least fragments $F_1$, $F_2$ and $F_3$. Fragments $F_1$, $F_2$ and $F_3$, that are part of the fragment gap at the given media streaming server system, may be obtained by a client 10 from other of the plurality of media streaming server systems 20-j which may have generated fragments $F_1$, $F_2$ and $F_3$.

Figure 4D:
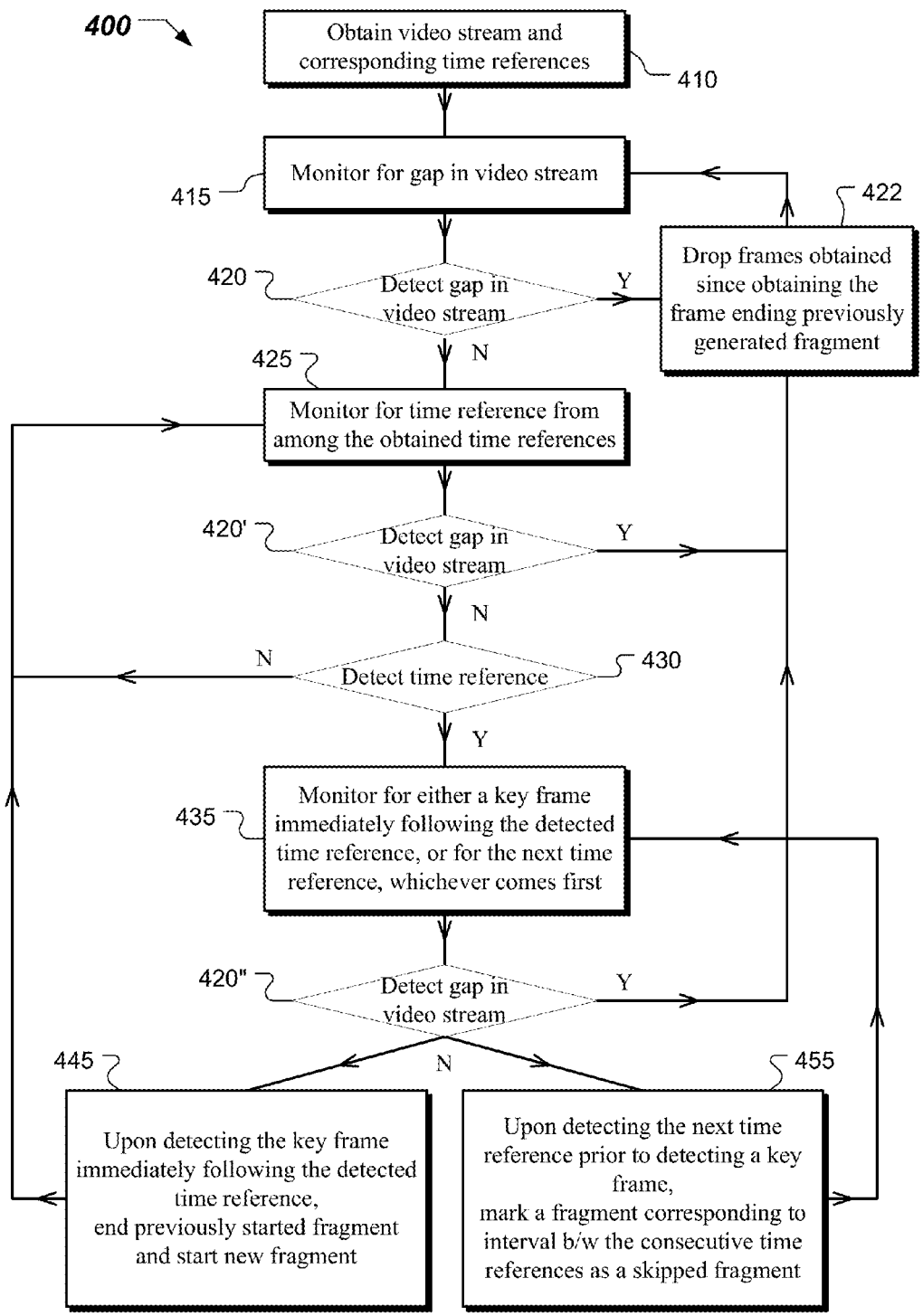
FIG. 4D shows an example method for fragmenting a media stream based on time references corresponding to the media stream.

FIG. 4D shows a flow chart of an example method 400 for fragmenting a video stream based on time references corresponding to the video stream. Aspects of method 400 can be used for the identifying 330 and for the generating 340 aspects of method 300 described above in connection with FIG. 3. Further, method 400 can be implemented for operating media stream fragmenter 200 described above in connection with FIG. 2.

Method 400 can begin by obtaining 410 a video stream and corresponding time references. Example video streams 210 and time references 220 corresponding to the video stream 210 were described above in connection with FIG. 2.

Method 400 includes monitoring 415 for a gap in the video stream. Some frames of the video stream may not be obtained because a media streaming server systems that runs a media stream fragmenter executing method 400 can go offline temporarily. Such missing frames represent a gap in the video stream. Upon detecting 420 a gap in the video stream, method 400 continues by dropping 422 frames of the video stream obtained since the frame ending the previously generated fragment was obtained.

However, if a gap in the video stream is not detected 420, then method 400 continues by monitoring 425 for a time reference from among the time references corresponding to the video stream. While monitoring 425 for the time reference, a gap in the video stream may be detected 420'. In such a situation, method 400 loops back to monitoring 415 for a gap in the video stream after dropping 422 the frames of the video stream obtained since the frame ending the previously generated fragment was obtained. If a gap in the video stream is not detected 420', and additionally if a time reference is not detected 430, then method 400 loops back to monitoring 425 for the time reference.

However, if a gap in the video stream is not detected 420', and additionally if a time reference is detected 430, then method 400 continues by monitoring 435 for either a key-frame immediately following the detected time reference, or for the next time reference, whichever comes first. While performing the monitoring 435, a gap in the video stream may be detected 420". In such a situation, method 400 loops back to monitoring 415 for a gap in the video stream after dropping 422 the frames of the video stream obtained since the frame ending the previously generated fragment was obtained.

If a gap in the video stream is not detected 420", and upon detecting the key-frame immediately following the detected time reference, method 400 includes ending the generation of a previously started fragment and starting to generate new fragment 445. When step 445 is completed, method 400 loops back to monitoring 425 for a next time reference.

If a gap in the video stream is not detected 420", and upon detecting the next time reference prior to detecting a key-frame, method 400 includes marking 455 a fragment corresponding to the interval between the detected consecutive time references as a skipped fragment. When the marking 455 is completed, method 400 loops back to monitoring 435 for either a key-frame immediately following the latest detected time reference, or for a time reference following the latest detected time reference, whichever comes first.

Method 400 as described in this specification can be applied to any of video stream fragmenting cases described above in connection with Examples 1-7.

FIG. 5A shows example implementations of a method 510 for obtaining a media stream. These implementations of method 510 can be combined with either of methods 300 and 400. Further, method 510 can be implemented to obtain a video stream 210 for fragmenting by media stream fragmenter 200.

In some implementations, e.g., in video-on-demand (VOD) applications, a video file can be stored 512 on a storage device communicatively coupled with a server system from among the plurality of media streaming server systems 20-j. The stored video file can be decoded 514 by the server system to obtain the video stream 210 to be fragmented by a media stream fragmenter 200 instance running on the server system. Copies of the video file can be stored 512 on other storage devices communicatively coupled with respectively other server systems from among the plurality of media streaming server systems 20-j. Alternatively, the storage device can be communicatively coupled with all of the plurality of media streaming server systems 20-j. Thus, the stored video file may be accessible to all of the plurality of media streaming server systems 20-j. In either video file storage implementation described above, the stored video file can be decoded 514 independently at any of the plurality of media streaming server systems 20-j.

In some implementations, e.g., in live video applications, a video feed source 30 can provide a video stream 210 to the plurality of media streaming server systems 20-j. Therefore, an instance of media stream fragmenter 200 running on a server system from among the plurality of media streaming server systems 20-j can receive 516 video stream 210 directly from video feed source 30.

Figure 5B:
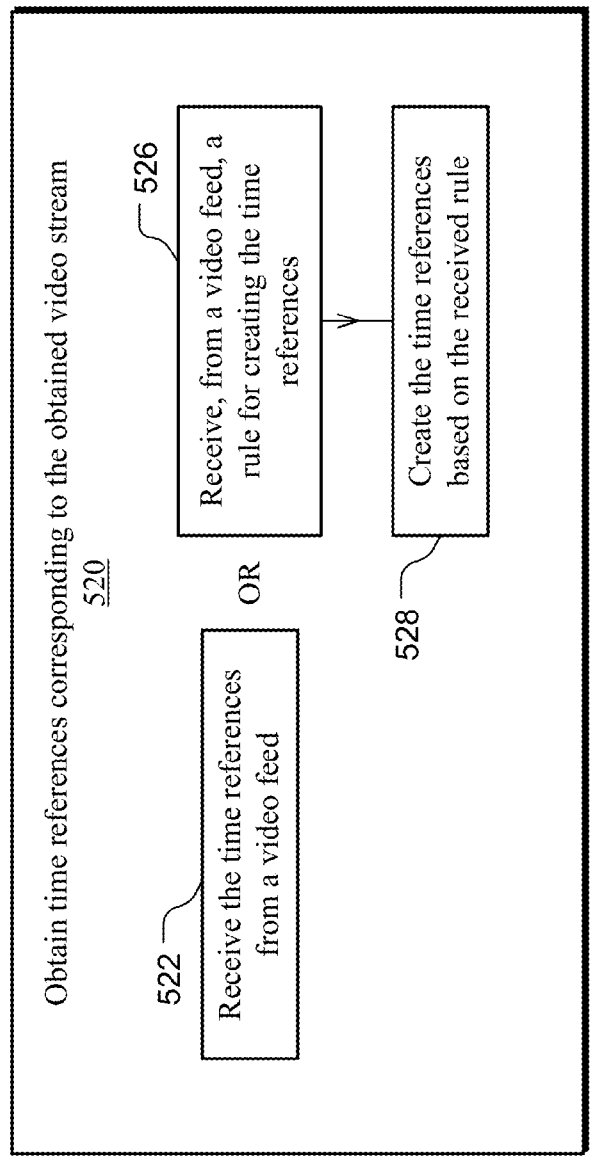
FIG. 5B shows example implementations of a method for obtaining time references corresponding to a media stream.

FIG. 5B shows example implementations of a method 520 for obtaining time references corresponding to the media stream. These implementations of method 520 can be combined with either of methods 300 and 400. Further, method 520 can be implemented to obtain time references 220 corresponding to media stream 210 for fragmenting the media stream 210 by media stream fragmenter 200.

In some implementations, time references 220 corresponding to video stream 210 can be received 522 from the source of the video stream, e.g., video feed source 30. Time references 220 can be a sequence of times synchronized to the timing of the video stream. For example, the first time reference t0=0 may correspond to the initial timestamp (t=0 ms) of video stream 210. Further, time references 220 may be equally distributed by a predetermined time period. For example the predetermined time period can be $\Delta t=4000$ ms. In this case, the received sequence of time references 220 can include t0=0, t1=4000, t2=8000, t3=12000, etc. In this example, the time unit of the received time references 220 is ms. Furthermore, time references 220 can be received during one transmission from the video source, e.g., prior to obtaining video stream 210. Alternatively, a portion of the time references corresponding to the first 6 minutes of the video stream can be received during a first transmission from the video source, then the time references corresponding to a portion of the video stream between 6-30 minutes can be received during a later transmission from the video source, etc.

Regardless of the structure of the time reference sequence or of the delivery method, the video source that provides time references 220 corresponding to video stream 210 is responsible for providing identical time references 220 to each of the plurality of media streaming server systems 20-j to obtain a unique framing structure across the plurality of media streaming server systems 20-j.

In some implementations, time references 220 can be obtained 520 via a calculation performed at each of the plurality of media streaming server systems 20-j. A rule for creating time references 220 corresponding to video stream 210 can be received 526 from the source of the video stream, e.g., video feed source 30. Further, each of the plurality of media streaming server systems 20-j can create 528 time references 220 based on the received rule. For example, a rule received 526 from the video source may include assigning the first time reference t0 to the initial timestamp (t=0 ms) of video stream 210. In addition, the rule may include a constant predetermined time period $\Delta t=4000$ ms, for instance. Based on the received 526 rule, each of the plurality of media streaming server systems 20-j can create 528 time references 220 by calculating $t1=t0+\Delta t=4000$, $t2=t1+\Delta t=8000$, etc.

Furthermore, the rule for creating time references 220 can be received during one transmission from the video source, e.g., prior to obtaining the video stream. Alternatively, a first rule for creating time references 220 corresponding to the first 6 minutes of the video stream can be received during a first transmission from the video source, then a second rule for creating the time references corresponding to a portion of the video stream between 6-30 minutes can be received during a later transmission from the video source, etc. Different rules may be provided by the video source to correspond to various portions of the video stream. For example, the frequency of time references 220 may be low during portions of video stream 210 corresponding to slow action, while the frequency of time references 220 may be high during portions of video stream 210 corresponding to fast action.

Regardless of the nature of a rule for creating the time reference sequence corresponding to video stream 210 or of a delivery method, the video source that provides the rule is responsible for providing identical rules to each of the plurality of media streaming server systems 20-j to obtain a unique framing structure across the plurality of media streaming server systems 20-j.

Figure 5C:
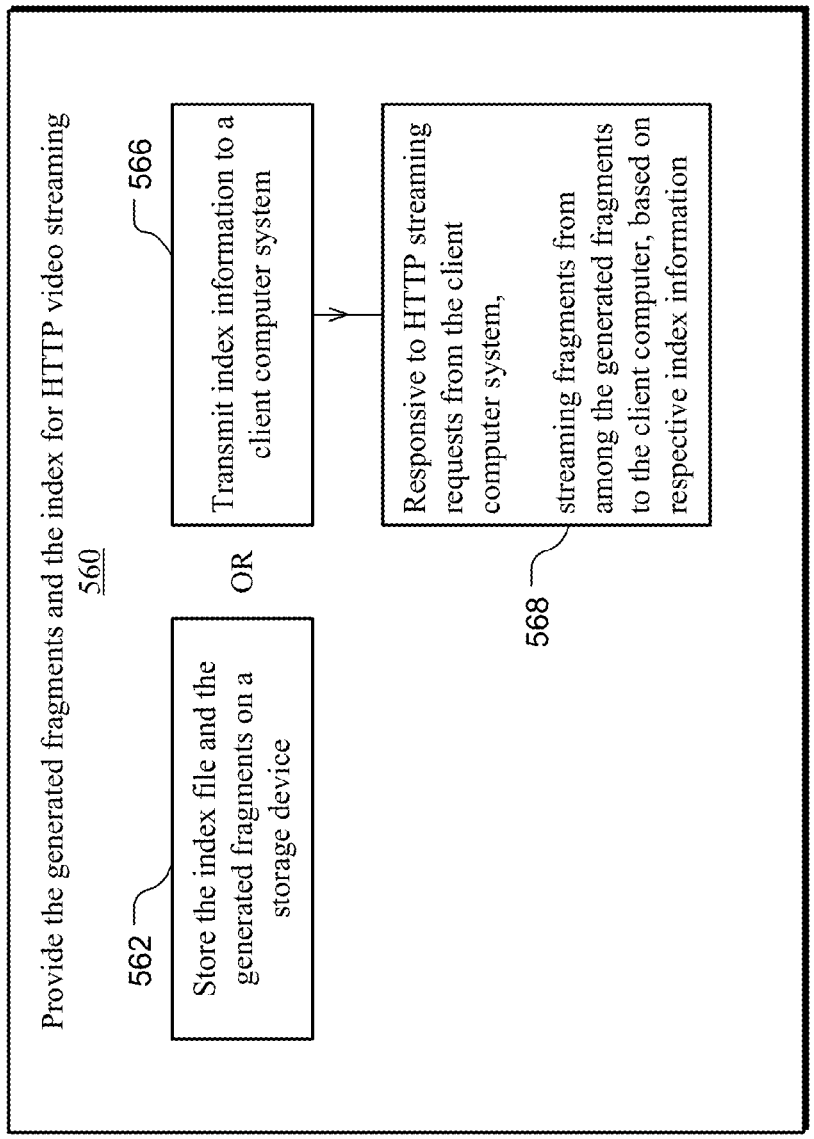
FIG. 5C shows example implementations of a method for providing indexed fragments of a media stream for HTTP media streaming.

FIG. 5C shows example implementations of a method 560 for providing the generated fragments and the index for HTTP video streaming. These implementations of method 560 can be combined with method 300. Further, method 560 can be implemented at any of the plurality of media streaming server systems 20-j for providing indexed fragments of a video stream for HTTP streaming.

In some implementations, e.g., in video-on-demand (VOD) applications, respective sets of fragments 230 and respective index files 240 generated by an instance of media stream fragmenter 200 associated with each of the plurality of media streaming server systems 20-j can be respectively stored 562 on a storage device associated with each of the plurality of media streaming server systems 20-j. The respective index file and respective set of fragments stored on each of the plurality of media streaming server systems 20-j correspond to a common HTTP framing structure across the plurality of media streaming server systems 20-j. Therefore, a user device 10 can place HTTP streaming requests for fragments of the video stream with any of the plurality of media streaming server systems 20-j storing the requested fragments.

In some implementations, e.g., in live video applications, each of the plurality of media streaming server systems 20-j running an associated instance of media stream fragmenter 200 can transmit 566 index information to a user device 10. Responsive to HTTP streaming requests from a user device 10 to a given server system from among the plurality of media streaming server systems 20-j, the given server system can stream 568 fragments from among the generated fragments to the user device 10, based on index information corresponding to the streamed fragments.

The respective index file and respective set of fragments generated on each of the plurality of media streaming server systems 20-j in accordance with methods 300 and 400 correspond to a common HTTP framing structure across the plurality of media streaming server systems 20-j. Thus, responsive to requests from the user device 10 to a server system from among the plurality of media streaming server systems 20-j for a given fragment, the server system can transmit to the user device 10 the given fragment from among the set of fragments associated with the server system. Implementations of method 560 over system 100 for HTTP streaming of video streams based on time referenced fragments are described below in connection with FIGS. 6A-6C.

System 600 can include a plurality of media streaming server systems 20'-1, 20'-2, . . . , 20'-n communicatively coupled with each other. Further, system 600 can include a client computer system 10' communicatively coupled with the plurality of media streaming server systems 20'-1, 20'-2, . . . , 20'-n. System 600 may also include a video feed source 30' including one or more image acquisition devices. Video feed source 30' is configured to encode a video stream to contain key-frames that can be aperiodically distributed with respect to timing of the video stream. Video feed source 30' is further configured to stream the video stream to the plurality of media streaming server systems 20'-1, 20'-2, . . . , 20'-n, and to provide to the plurality of media streaming server systems 20'-1, 20'-2, . . . , 20'-n time references corresponding to the video stream.

Each of the media streaming server systems is configured to obtain the video stream and the corresponding time references from video feed source 30'. In addition, each of the media streaming server systems is configured to identify key-frames in the video stream, such that each of the identified key-frames is a first key-frame immediately following a corresponding time reference from among the obtained references. Each of the media streaming server systems is also configured to generate an associated set of fragments of the video stream corresponding to the identified key-frames, respectively, and to index the associated set of fragments in an associated index file. For example, media streaming server system 20'-1 generated fragments F1, F2 and F4 of the video stream, and stored index information in index file I1. For example, media streaming server system 20'-2 generated fragments F1, F3 and F5 of the video stream, and stored index information in index file I2. For example, media streaming server 20'-3 generated fragments F4, F6 and F7 of the video stream, and stored index information in index file I3.

The client computer system 10' includes a media player device configured to request a given fragment of the media stream from a media streaming server system from among the plurality of media streaming server systems 20'-1, 20'-2, . . . , 20'-n. The media player of the client computer system 10' is further configured to receive the given fragment and subsequently to play the given fragment.

In some implementations, the client computer system 10' can obtain the entire media stream from one of the plurality of media streaming server systems 20'-1, 20'-2, . . . , 20'-n. In other implementations, the client computer system 10' can obtain portions of the media stream from respective multiple ones of the plurality of media streaming server systems 20'-1, 20'-2, . . . , 20'-n.

Figure 6A:
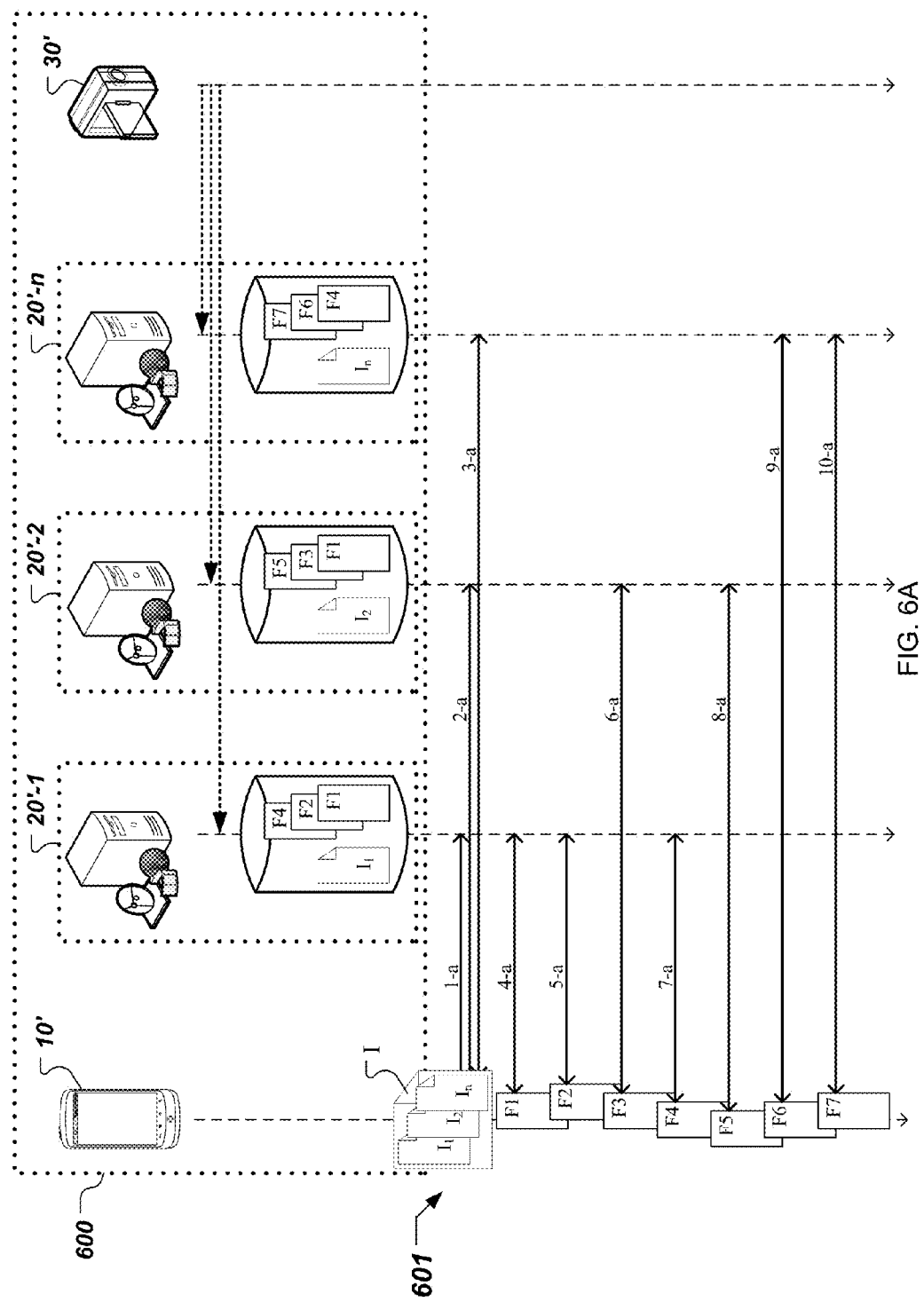

FIG. 6A shows an HTTP video streaming configuration 601 of system 600. Client computer system 10' is further configured to request a plurality of respective index files from the plurality of media streaming server systems 20'-1, 20'-2, . . . , 20'-n. For example, the client computer system requests and receives "1-a" the index file I1 from media streaming server system 20'-1, requests and receives "2-a" the index file I2 from media streaming server system 20'-2, and requests and receives "3-a" the index file In from media streaming server system 20'-n. The client computer system is further configured to aggregate the received plurality of respective index files I1, I2, . . . , In into a client side master index, I.

HTTP video streaming configuration 601 is based on communications between client computer system 10' and the plurality of media streaming server systems 20'-1, 20'-2, . . . , 20'-n for requesting and receiving fragments of the media stream. The communications corresponding to HTTP video streaming configuration 601 are performed in accordance with information included in the client side master index.

Client computer system 10' can request fragment F1 from media streaming server system 20'-1 or from media streaming server system 20'-2. In some implementations, client computer system 10' can be configured to select a server system having highest transfer rate and smallest latency, for instance. In some other implementations, a given server may have one or more designated backup servers, for example, media streaming server system 20'-2 is designated to substitute for media streaming server system 20'-1. In this case, an HTTP request for a given fragment is first addressed to media streaming server system 20'-1, and if media streaming server system 20'-1 is temporarily not available (offline, busy with other tasks and non-responsive, and the like,) the request may be addressed to the stand-in media streaming server system 20'-2. In this case, client computer system 10' requests and receives "4-a" fragment F1 from media streaming server system 20'-1.

Client computer system 10' can request fragment F2 from media streaming server system 20'-1, as media streaming server system 20'-2 and media streaming server system 20'-n lack fragment F2. Consequently, client computer system 10' requests and receives "5-a" fragment F2 from media streaming server system 20'-1.

Client computer system 10' can request fragment F3 from media streaming server system 20'-2, as media streaming server system 20'-1 and media streaming server system 20'-n lack fragment F3. Consequently, client computer system 10' requests and receives "6-a" fragment F3 from media streaming server system 20'-2.

Client computer system 10' can request fragment F4 from media streaming server system 20'-1 or from media streaming server system 20'-n. In this example, that the communication channel between the client computer system 10' and the media streaming server system 20'-1 has a broader bandwidth than the communication channel between the client computer system 10' and the media streaming server system 20'-n; therefore, client computer system 10' requests and receives "7-a" fragment F4 from media streaming server system 20'-1.

Client computer system 10' can request fragment F5 from media streaming server system 20'-2, as media streaming server system 20'-1 and media streaming server system 20'-n lack fragment F5. Consequently, client computer system 10' requests and receives "8-a" fragment F3 from media streaming server system 20'-2.

Client computer system 10' can request fragments F6 and F7 from media streaming server system 20'-n, as media streaming server system 20'-1 and media streaming server system 20'-2 lack fragments F6 and F7. Consequently, client computer system 10' requests and receives "9-a" fragment F6 from media streaming server system 20'-n. Additionally, client computer system 10' requests and receives "10-a" fragment F7 from media streaming server system 20'-n.

Figure 6B:
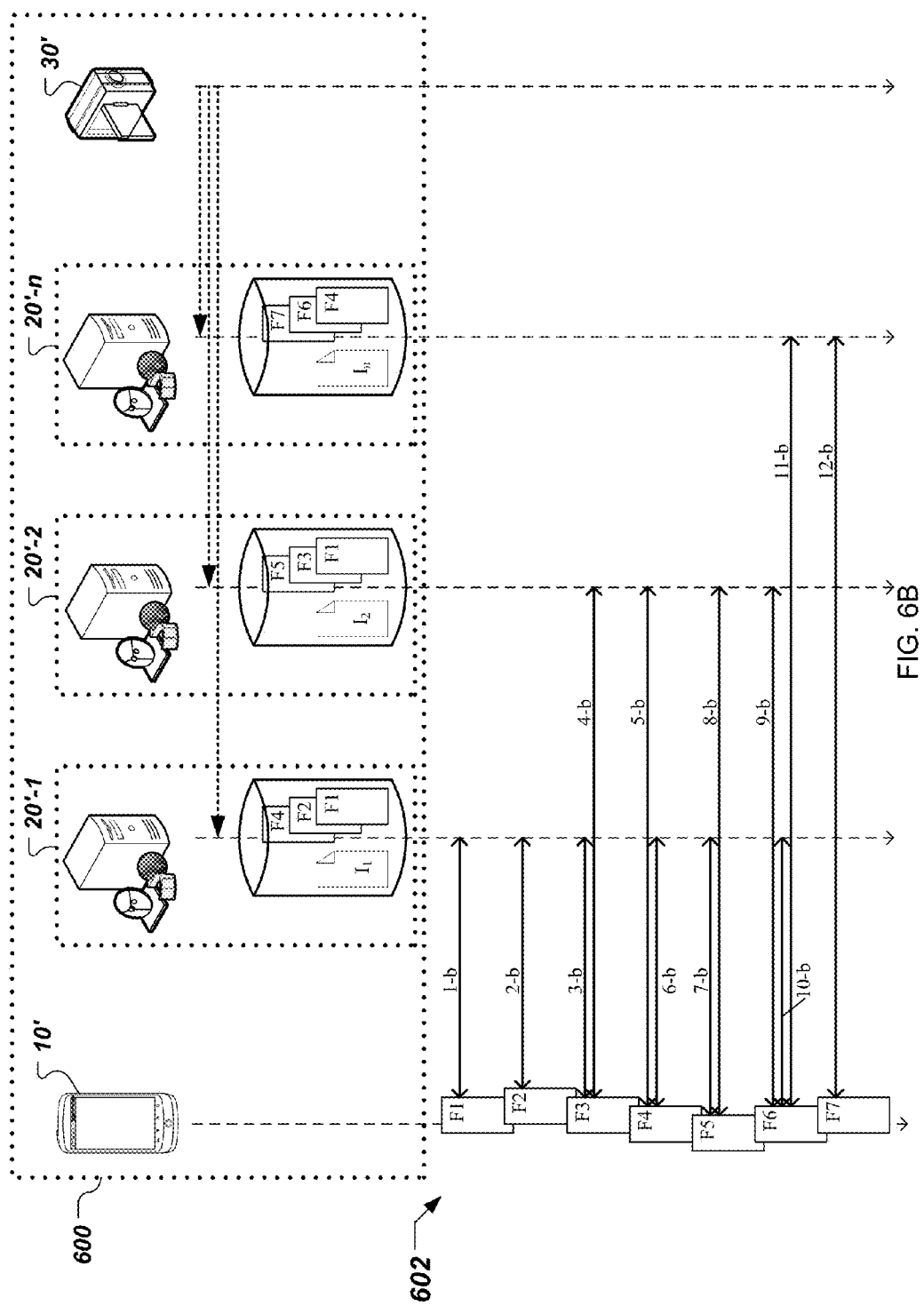

FIG. 6B shows another HTTP video streaming configuration 602 of system 600. Upon receiving from the media streaming server system a response indicating that the requested given fragment is unavailable, client computer system 10' can request the given fragment from another media streaming server system from among the plurality of media streaming server systems 20'-1, 20'-2, . . . , 20'-n.

Client computer system 10' can choose to request fragment F1 from any one of the plurality of media streaming server systems 20'-1, 20'-2, . . . , 20'-n. In this example, client computer system 10' requests "1-b" fragment F1 from media streaming server system 20'-1. As media streaming server system 20'-1 has previously generated fragment F1, media streaming server system 20'-1 provides "1-b" fragment F1 to the client computer system 10'.

Once a communication channel for HTTP streaming has been established between client computer system 10' and a given media streaming server system, and further once at least one fragment of a video stream has been successfully requested and received through such established communication channel, it may be beneficial for the client computer system 10' to request subsequent fragments from the given media streaming server system. Therefore, client computer system 10' requests "2-b" fragment F2 from media streaming server system 20'-1. As media streaming server system 20'-1 has previously generated fragment F2, media streaming server system 20'-1 provides "2-b" fragment F2 to the client computer system 10'.

Client computer system 10' requests "3-b" fragment F3 from media streaming server system 20'-1. However, media streaming server system 20'-1 responds "3-b" by informing client computer system 10' that fragment F3 is locally unavailable. Client computer system 10' can then choose to request fragment F3 from the other media streaming server systems 20'-2 or 20'-n. In this example, client computer system 10' requests "4-b" fragment F3 from media streaming server system 20'-2. (The choice of requesting fragment F3 from media streaming server system 20'-2 over streaming server system 20'-n can be random, or can be based on a predetermined order.) As media streaming server system 20'-2 has previously generated fragment F3, media streaming server system 20'-2 provides "4-b" fragment F3 to the client computer system 10'.

Client computer system 10' requests "5-b" fragment F4 from media streaming server system 20'-2. However, media streaming server system 20'-2 responds "5-b" by informing client computer system 10' that fragment F4 is locally unavailable. Client computer system 10' can then choose to request fragment F4 from the other media streaming server systems 20'-1 or 20'-n. Upon receiving an indication from a given media streaming server that a fragment of the video stream is unavailable, it may be beneficial for client computer system 10' to request the missing fragment from the media streaming server system that had most recently provided previous fragments of the media stream. Therefore, client computer system 10' requests "6-b" fragment F4 from media streaming server system 20'-1. As media streaming server system 20'-1 has previously generated fragment F4, media streaming server system 20'-1 provides "6-b" fragment F4 to the client computer system 10'.

Client computer system 10' requests "7-b" fragment F5 from media streaming server system 20'-1. However, media streaming server system 20'-1 responds "7-b" by informing client computer system 10' that fragment F5 is locally unavailable. Then, client computer system 10' requests and receives "8-b" fragment F5 from media streaming server system 20'-2.

Client computer system 10' requests "9-b" fragment F6 from media streaming server system 20'-2. However, media streaming server system 20'-2 responds "9-b" by informing client computer system 10' that fragment F6 is locally unavailable. Then, client computer system 10' requests "10-b" fragment F6 from media streaming server system 20'-1. Media streaming server system 20'-1 responds "10-b" by informing client computer system 10' that fragment F6 is locally unavailable. Then, client computer system 10' requests and receives "11-b" fragment F6 from media streaming server system 20'-n.

Finally, client computer system 10' requests and receives "12-b" fragment F7 from media streaming server system 20'-n.

FIG. 6C shows another HTTP video streaming configuration 603 of system 600. Upon determining by the media streaming server system that the given fragment requested by client computer system 10' is locally unavailable, the media streaming server system can assist client computer system 10' to obtain the given fragment from another media streaming server system from among the plurality of media streaming server systems 20'-1, 20'-2, ..., 20'-n.

Client computer system 10' can choose to request fragment F1 from any one of the plurality of media streaming server systems 20'-1, 20'-2, ..., 20'-n. In this example, client computer system 10' requests "1-c" fragment F1 from media streaming server system 20'-1. As media streaming server system 20'-1 has previously generated fragment F1, media streaming server system 20'-1 provides "1-c" fragment F1 to the client computer system 10'.

Once a communication channel for HTTP streaming has been established between client computer system 10' and a given media streaming server system, and further once at least one fragment of a video stream has been successfully requested and received through such established communication channel, it may be beneficial for the client computer system 10' to request subsequent fragments from the given media streaming server system. Therefore, client computer system 10' requests "2-c" fragment F2 from media streaming server system 20'-1. As media streaming server system 20'-1 has previously generated fragment F2, media streaming server system 20'-1 provides "2-c" fragment F2 to the client computer system 10'.

Client computer system 10' requests "3-c" fragment F3 from media streaming server system 20'-1. However, media streaming server system 20'-1 determines that fragment F3 is locally unavailable. Once a given media streaming server system determines that a requested fragment is locally unavailable, the given media streaming server system can communicate with other ones of the plurality of media streaming server systems 20'-1, 20'-2, ..., 20'-n to identify media streaming server systems that have the requested fragment. In some configurations, the given media streaming server system may communicate with the other ones of the plurality of media streaming server systems 20'-1, 20'-2, ..., 20'-n that satisfy a particular criterion. The criterion may be based on geographic proximity, quality of service, communication channel properties, and the like. In this example, media streaming server system 20'-2 satisfies the particular criterion, while media streaming server system 20'-n does not satisfy the given criterion. Therefore, media streaming server system 20'-1 communicates "4-c" with media streaming server system 20'-2 to determine availability of fragment F3. Upon determining that fragment F3 is available at media streaming server system 20'-2, media streaming server system 20'-1 relays "3-c" this information to client computer system 10'. Consequently, client computer system 10' requests and receives "5-c" fragment F3 from media streaming server system 20'-2.

Client computer system 10' requests "6-c" fragment F4 from media streaming server system 20'-2. However, media streaming server system 20'-2 determines that fragment F4 is locally unavailable. In this example, both media streaming server systems 20'-1 and 20'-n satisfy the particular criterion described above. Therefore, media streaming server system 20'-2 communicates "7-c" with media streaming server system 20'-1 and further communicates "7'-c" with media streaming server system 20'-n to determine availability of fragment F4. Upon determining that fragment F4 is available at media streaming server systems 20'-1 and 20'-n, media streaming server system 20'-2 relays "6-c" this information to client computer system 10'. Client computer system 10' can then choose to request fragment F4 from either of media streaming server systems 20'-1 or 20'-n. It may be beneficial for client computer system 10' to request a missing fragment from the media streaming server system that had most recently provided previous fragments of the media stream. Therefore, client computer system 10' requests and receives "8-c" fragment F4 from media streaming server system 20'-1.

Client computer system 10' requests "9-c" fragment F5 from media streaming server system 20'-1. However, media streaming server system 20'-1 determines that fragment F5 is locally unavailable. Further, media streaming server system 20'-1 communicates "10-c" with media streaming server system 20'-2 to determine availability of fragment F5. Upon determining that fragment F5 is available at media streaming server system 20'-2, media streaming server system 20'-1 relays "9-c" this information to client computer system 10'. Consequently, client computer system 10' requests and receives "11-c" fragment F5 from media streaming server system 20'-2.

Client computer system 10' requests "12-c" fragment F6 from media streaming server system 20'-2. However, media streaming server system 20'-2 determines that fragment F6 is locally unavailable. Further, media streaming server system 20'-2 communicates "13-c" with media streaming server system 20'-1 and further communicates "13'-c" with media streaming server system 20'-n to determine availability of fragment F6. Upon determining that fragment F6 is available at media streaming server system 20'-n, media streaming server system 20'-2 relays "12-c" this information to client computer system 10'. Therefore, client computer system 10' requests and receives "14-c" fragment F6 from media streaming server system 20'-n.

Finally, client computer system 10' requests and receives "15-c" fragment F7 from media streaming server system 20'-n.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   obtaining time references corresponding to a video stream;
   identifying key frames in the video stream, each of the identified key frames being a key frame following a corresponding time reference from among the obtained time references without intervening one or more key frames in the video stream or one or more time references of the obtained time references between the corresponding time reference and the key frame; and
   generating fragments of the video stream, each of the generated fragments being associated with one of the identified key frames and including an associated contiguous sequence of frames starting with the associated key frame and ending with a frame that precedes another of the identified key frames that consecutively follows the associated key frame.

2. The method of claim 1, wherein said obtaining the time references comprises:
   receiving the time references by the data processing apparatus.

3. The method of claim 1, wherein said obtaining the time references comprises:
   receiving a rule for creating the time references; and
   generating the time references by the data processing apparatus.

4. The method of claim 1, further comprising obtaining the video stream by the data processing apparatus.

5. The method of claim 4, wherein said obtaining the video stream comprises:
   storing a video file at a storage device communicatively coupled with the data processing apparatus; and
   decoding the stored video file to obtain the video stream.

6. The method of claim 4, wherein said obtaining the video stream comprises receiving the video stream by the data processing apparatus from a video feed source.

7. The method of claim 1, wherein:
   the obtained time references are equally distributed by a predetermined time period, and
   the video stream comprises key frames aperiodically distributed with respect to timing of the video stream.

8. The method of claim 7, further comprising dropping a fragment followed by a gap between the fragment and a corresponding subsequent fragment.

9. The method of claim 1, further comprising:
   indexing the generated fragments in an index file; and providing the index file and the generated fragments for http video streaming.

10. The method of claim 9, wherein said indexing comprises listing a fragment name, a fragment start time and a file system path for each fragment of the generated fragments.

11. The method of claim 9, wherein said providing comprises storing the index file and the generated fragments on a storage device.

12. The method of claim 9, wherein said providing comprises:
transmitting the index file to a client computer system communicatively coupled with the data processing apparatus; and
responsive to http streaming requests from the client computer system, streaming fragments from among the generated fragments to the client computer, based on respective entries of the index file.

13. The method of claim 9, wherein said identifying, said generating and said indexing are performed by the data processing apparatus at each of a multiple server systems to generate respective sets of fragments and respective index files, the method further comprising:
transmitting the respective index files to a client computer system communicatively coupled with the multiple server systems, said transmitting comprising said providing; and
responsive to a request from the client computer system to a server system from among the multiple server systems for a given fragment, transmitting to the client computer the given fragment from among the set of fragments associated with the server system.

14. A system comprising:
multiple media streaming server systems communicatively coupled with each other and with a client computer system, wherein each of the multiple media streaming server systems includes one or more hardware processors configured to perform operations comprising:
obtaining time references corresponding to a video stream;
identifying key frames in the video stream, each of the identified key frames being a key frame following a corresponding time reference from among the obtained time references without intervening key frame in the video stream or time reference of the obtained time references between the corresponding time reference and the key frame;
generating an associated set of fragments of the video stream, each of the fragments of the generated set being associated with one of the identified key frames and including an associated contiguous sequence of frames starting with the associated key frame and ending with a frame that precedes another of the identified key frames that consecutively follows the associated key frame; and
indexing the associated set of fragments in an associated index file.

15. The system of claim 14, further comprising the client computer system, wherein the client computer system includes a media player configured to perform player operations comprising:
requesting respective index files from the multiple media streaming server systems;
aggregating the received respective index files into a client side master index;
requesting a given fragment of the media stream from a media streaming server system from among the multiple media streaming server systems based on information included in the client side master index; and
receiving the given fragment and subsequently playing the given fragment.

16. The system of claim 15, wherein the player operations further comprise, upon receiving from the media streaming server system a response indicating that the requested given fragment is unavailable, requesting the given fragment from another media streaming server system from among the multiple media streaming server systems.

17. The system of claim 14, wherein the one or more hardware processors of each of the multiple media streaming server systems are configured to perform further operations comprising, upon determining that a given fragment requested by the client computer system is locally unavailable, instructing another media streaming server system from among the multiple media streaming server systems to provide the given fragment to the client computer system.

18. The system of claim 14, further comprising:
a video feed source comprising one or more image acquisition devices, wherein the video feed source is configured to perform operations comprising:
streaming the video stream to the multiple media streaming server systems; and
providing to the multiple media streaming server systems the time references corresponding to the video stream.

19. The system of claim 18, wherein the video feed source is further configured to perform operations comprising:
setting the time references to be equally distributed by a predetermined time period, and
encoding the video stream to comprise key frames aperiodically distributed with respect to timing of the video stream.

20. A non-transitory computer storage medium encoded with a computer program, the program comprising instructions that when executed by data processing apparatus cause the data processing apparatus to perform operations comprising:
obtaining time references corresponding to a video stream, wherein the video stream comprises key frames aperiodically distributed with respect to timing of the video stream, and wherein the obtained time references are equally distributed by a predetermined time period;
identifying key frames in the video stream, each of the identified key frames being a key frame following a corresponding time reference from among the obtained time references without intervening one or more key frames in the video stream or one or more time references of the obtained time references between the corresponding time reference and the key frame; and
generating fragments of the video stream, wherein each of the generated fragments is associated with one of the identified key frames and includes an associated contiguous sequence of frames starting with the associated key frame and ending with a frame that precedes another of the identified key frames that consecutively follows the associated key frame.

21. The non-transitory computer storage medium of claim 20, wherein the operations further comprise dropping a fragment followed by a gap between the fragment and a corresponding subsequent fragment.

22. The non-transitory computer storage medium of claim 20, wherein the operations further comprise:
indexing the generated fragments in an index file; and
providing the index file and the generated fragments for http video streaming.

23. The non-transitory computer storage medium of claim 22, wherein
- the data processing apparatus is distributed over multiple server systems,
- the operations of obtaining the video stream and the corresponding time references, of identifying, of generating and of indexing are performed by the data processing apparatus at each of the multiple server systems to generate respective sets of fragments and respective index files, and
- the operation of providing is performed by the data processing apparatus at each server system from among the multiple server systems and comprises:
  - transmitting the respective index files to a client computer system that is communicatively coupled with the multiple server systems, and
  - in response to receiving a request from the client computer system for a given fragment, transmitting to the client computer the given fragment from among the set of fragments associated with the server system.

* * * * *